(12) United States Patent
Iriguchi et al.

(10) Patent No.: US 9,152,143 B2
(45) Date of Patent: Oct. 6, 2015

(54) AUTOMATIC PROGRAMMING APPARATUS AND AUTOMATIC PROGRAMMING METHOD

(75) Inventors: Kenji Iriguchi, Tokyo (JP); Yuka Mitani, Tokyo (JP); Akira Miyata, Tokyo (JP); Tomonori Sato, Tokyo (JP); Susumu Matsubara, Tokyo (JP); Takashi Iwasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 618 days.

(21) Appl. No.: 13/377,292

(22) PCT Filed: Jul. 6, 2010

(86) PCT No.: PCT/JP2010/004400
§ 371 (c)(1),
(2), (4) Date: Dec. 9, 2011

(87) PCT Pub. No.: WO2011/004585
PCT Pub. Date: Jan. 13, 2011

(65) Prior Publication Data
US 2012/0089242 A1      Apr. 12, 2012

(30) Foreign Application Priority Data

Jul. 6, 2009   (JP) ................................ 2009-159690

(51) Int. Cl.
*G05B 19/4097*   (2006.01)
*G05B 19/4093*   (2006.01)

(52) U.S. Cl.
CPC  *G05B 19/40931* (2013.01); *G05B 2219/36327* (2013.01)

(58) Field of Classification Search
CPC ............ G05B 2219/36193; G05B 2219/36221
USPC ................................................. 700/159, 181
See application file for complete search history.

(56) References Cited

U.S. PATENT DOCUMENTS 6,957,123 B2 * 10/2005 Nakamura ..................... 700/181
7,096,087 B2 *  8/2006 Sagawa et al. ................ 700/160

FOREIGN PATENT DOCUMENTS

| JP | 62 224550   | 10/1987 |
| JP | 2005 031904 |  2/2005 |
| JP | 2005 271148 | 10/2005 |
| JP | 2007 015084 |  1/2007 |

OTHER PUBLICATIONS

Asakawa et al., "Automation of Chamfering by an Industrial Robot; for the Case of Hole on a Free Cured Surface", Oct. 2002, Journal of Robotics and Computer—Integrated Manufacturing, 18 (5-6): 379-385.*
U.S. Appl. No. 13/377,171, filed Dec. 9, 2011, Mitani et al.
International Search Report issued on Sep. 14, 2010 in PCT/JP10/004400 filed on Jul. 6, 2010.

* cited by examiner

*Primary Examiner* — Mohammad Ali
*Assistant Examiner* — John Park
(74) *Attorney, Agent, or Firm* — Oblon, McClelland, Maier & Neustadt, L.L.P.

(57) ABSTRACT

Automatic programming apparatus includes: a material shape data input unit that receives input of data of material shape; a processing program storage unit that stores therein data of material shape and processed unit data; a processed unit data input part that receives an input of other-processed-unit-reference-type processed unit data referencing processed region shape data contained in the processed unit data; a processed region shape generating unit that generates processed region shape data in the processed unit data for partial processing, based on data of material shape and processed region shape data referenced by other-processed-unit-reference-type processed unit data; and a control command generating unit that generates control command data, based on processed unit data for partial processing containing processed region shape data.

2 Claims, 18 Drawing Sheets

FIG.3

| PROCESSED UNIT |
|---|
| PROCESSED REGION SHAPE:<br>  CLOSED CONTOUR SHAPE ON Z-X PLANE<br>    - PROCESSING GOAL CONTOUR SHAPE<br>    - PROCESSED REGION CONTOUR SHAPE |
| PROCESSING METHOD:<br>  OUTER-SHAVING TURNING,<br>  ROUGH PROCESSING →<br>  FINISHING PROCESSING |
| TOOLS TO BE USED:<br>  ROUGH PROCESSING - TURNING Byte 1<br>  FINISHING PROCESSING - TURNING Byte 1 |
| PROCESSING CONDITIONS:<br>  ROUGH PROCESSING -<br>  MAIN SHAFT ROTATION NUMBER 1,<br>  FEED 1<br>  FINISHING PROCESSING -<br>  MAIN SHAFT ROTATION NUMBER 2,<br>  FEED 2 |

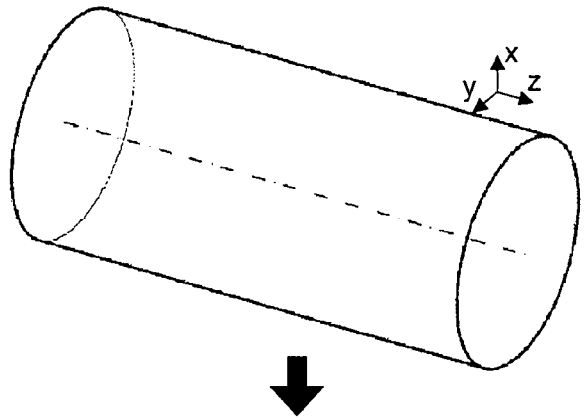

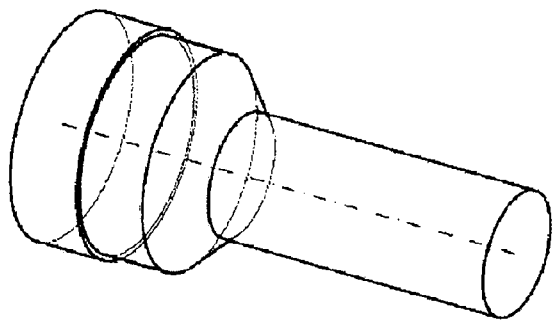

FIG.6A
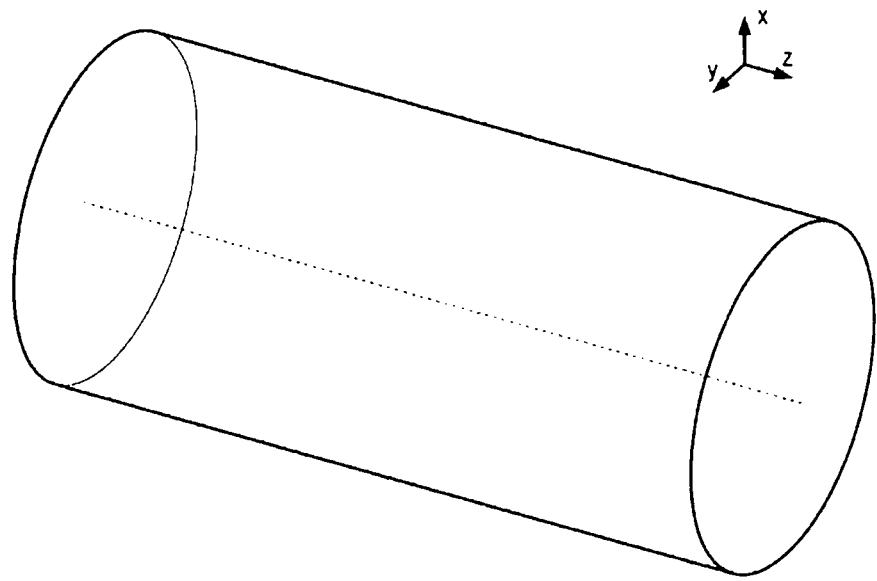
FIG.6B
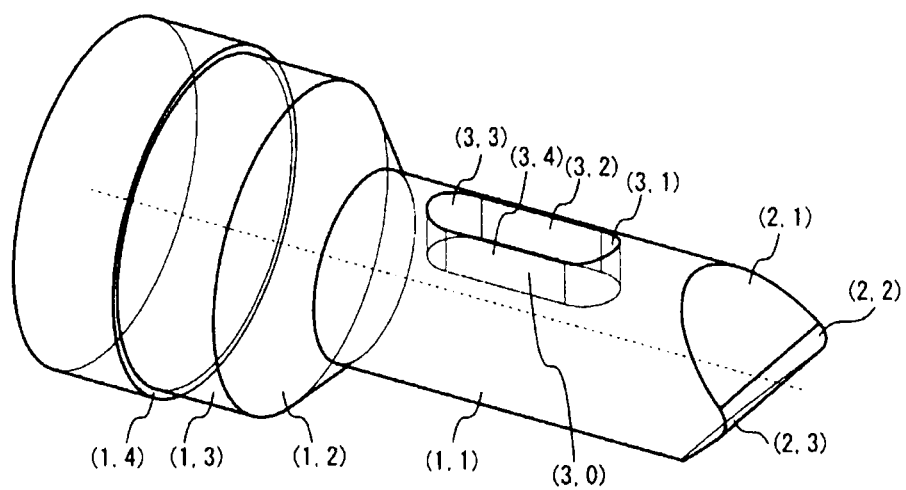

FIG.8

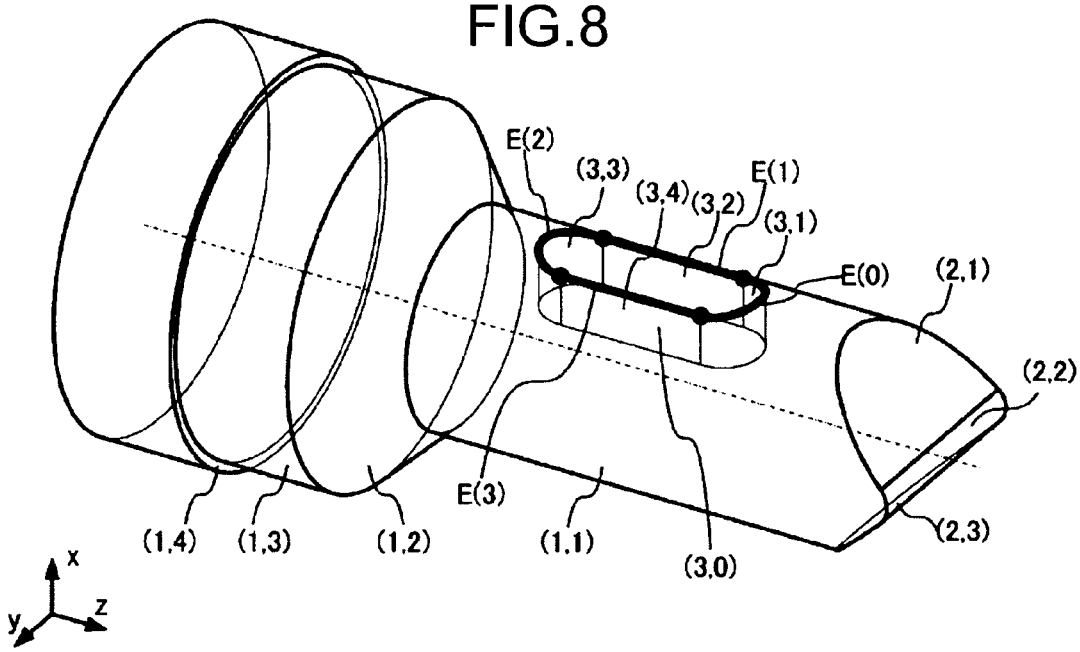

FIG.9

| PROCESSED UNIT 4 |
|---|
| PROCESSED REGION SHAPE:<br>- CHAMFERING TARGET PART SHAPE REFERENCE<br>- CHAMFERED SHAPE PATTERN<br>- CHAMFERING PARAMETERS |
| PROCESSING METHOD:<br>CHAMFERING PROCESS |
| TOOLS TO BE USED:<br>CHAMFERING CUTTER |
| PROCESSING CONDITIONS:<br>MAIN SHAFT ROTATION NUMBER 1, FEED 1 |
| ⋮ |

FIG.10

| EDGE NUMBER | 0 | 1 | 2 | 3 |
|---|---|---|---|---|
| LEFT PROCESSED UNIT NUMBER | 1 | 1 | 1 | 1 |
| LEFT PROCESSED UNIT PLANE NUMBER | 1 | 1 | 1 | 1 |
| RIGHT PROCESSED UNIT NUMBER | 3 | 3 | 3 | 3 |
| RIGHT PROCESSED UNIT PLANE NUMBER | 1 | 2 | 3 | 4 |

AUTOMATIC PROGRAMMING APPARATUS AND AUTOMATIC PROGRAMMING METHOD

FIELD

The present invention relates to an automatic programming apparatus and an automatic programming method for receiving an input of processed unit data or machining unit data that is used for performing partial processing or partial machining and contains data indicating a processed region shape or a machined region shape, a processing method or a machining method, tools to be used, and processing conditions or machining conditions and generating control command information to operate a machine tool based on the input processed unit data or machining unit data.

BACKGROUND

Conventional examples of automatic programming apparatuses configured to receive an input of processed unit data or machining unit data that is used for performing partial processing or partial machining and contains data indicating a processed region shape or a machined region shape, a processing method or a machining method, tools to be used, and processing conditions and to generate control command information to operate a machine tool based on the input processed unit data include an automatic programming apparatus that uses, as a method for defining processing or machining such as a chamfering process, a method by which the shape of a target part of the processing or the machining is directly specified by using a shape element such as a line or an arc (see, for example, Patent Document 1) and an automatic programming apparatus that generates an intermediate workpiece shape prior to a chamfering process or chamfering machine based on a Numerical Control (NC) computer program (hereinafter, "NC program") up to a time before the chamfering process is performed and automatically extracts a target part of the chamfering process from the generated intermediate workpiece shape (see, for example, Patent Document 2).

CITATION LIST

Patent Literature

Patent Literature 1: Japanese Patent Application Laid-open No. S62-224550 (page 4, FIG. 8)
Patent Literature 2: Japanese Patent Application Laid-open No. 2005-31904 (pages 6-9, FIG. 1)

SUMMARY

Technical Problem

The conventional automatic programming apparatuses have a problem where it is not possible to properly specify the shape of the processed part or the machined part when the shape of the processing target part or the machining target part is a complicated curving shape such as an edge of a hole or a groove formed on a circular cylinder surface. Further, according to the method by which a chamfering target part is automatically extracted from the pre-chamfering-process intermediate workpiece shape generated based on the NC program up to the time before the chamfering process is performed, a problem remains where it is not possible to assign, to each of the processed parts, an appropriate chamfering process suitable for the shape of the processed part, when the processed parts are chamfered parts represented by an edge of a curved plane where the shapes of the chamfered parts are in various states.

To solve the problems described above, an object of the present invention is to obtain an automatic programming apparatus that makes it possible to easily define processed unit data and form an appropriate processed region shape or machined region shape according to the shape of a curving part, even if the shape of the processing target part or the machining target part is a complicated curving shape such as an edge of a hole or a groove formed on a circular cylinder surface.

Solution to Problem

In order to solve the aforementioned problems and attain the aforementioned object, the automatic programming apparatus that generates control command data, based on processed unit data or machining unit data for partial processing to apply partial processing to a material shape, is provided with: a material shape data input unit that receives an input of data of the material shape; a processing program storage unit or a machining program storage unit that stores therein the data of the material shape and processed unit data or machining unit data; a processed unit data input part or a machining unit data input part that receives an input of other-processed-unit-reference-type processed unit data referencing processed region shape data or machined region shape data contained in the processed unit data stored in the processing program storage unit and that outputs the other-processed-unit-reference-type processed unit data to the processing program storage unit or the machining program storage unit; a processed region shape or a machined region shape generating unit that generates processed region shape data in the processed unit data for the partial processing, based on the data of the material shape and the processed region shape data referenced by the other-processed-unit-reference-type processed unit data; and a control command generating unit that generates the control command data, based on the processed unit data for the partial processing containing the processed region shape data.

Advantageous Effects of Invention

According to an aspect of the present invention, it is possible to generate the processed region shape data in the processed unit data for the partial processing based on the data of the material shape and the processed region shape data referenced by the other-processed-unit-reference-type processed unit data. Thus, it is possible to easily define the processed unit data and to form the appropriate processed region shape according to the shape of the curving part, even if the shape of the processing target part is a complicated curving shape such as an edge of a hole or a groove formed on a circular cylinder surface.

BRIEF DESCRIPTION OF DRAWINGS

FIG. 3 depicts processed unit data for an outer-shaving turning process according to the first embodiment of the present invention.

FIGS. 4A and 4B are perspective views depicting material shapes before and after the outer-shaving turning process according to the first embodiment of the present invention.

FIGS. 6A and 6B are perspective views depicting material shapes before and after processing according to the first embodiment of the present invention.

FIG. 8 is a perspective view of selected edges according to the first embodiment of the present invention.

FIG. 9 depicts processed unit data for a chamfering process according to the first embodiment of the present invention.

FIG. 10 depicts chamfering target part shape reference data according to the first embodiment of the present invention.

DESCRIPTION OF EMBODIMENTS

First Embodiment

Figure 1:
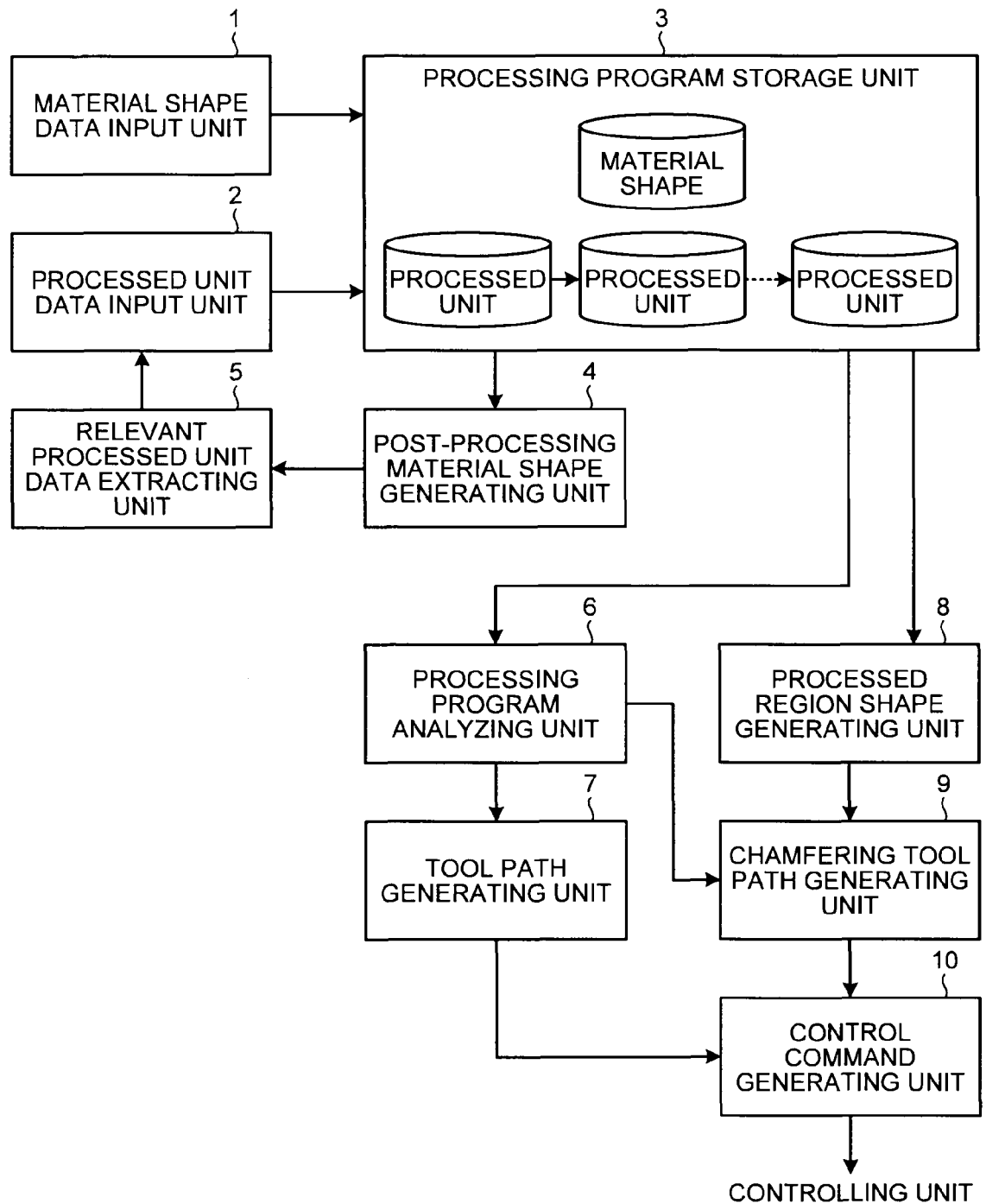
FIG. 1 is a diagram of an automatic programming apparatus according to a first embodiment of the present invention.

FIG. 1 is a diagram of an automatic programming apparatus according to a first embodiment of the present invention.

The automatic programming apparatus is configured to generate control command data, based on processed unit data or machining unit data for partial processing or partial machining to apply partial processing to a material shape. The automatic programming apparatus receives an input of the processed unit data for performing the partial processing containing data indicating, for example, a processed region shape or a machined region shape, a processing method or a machining method, tools to be used, and processing conditions or machining conditions and generates the control command data for operating a machine tool by analyzing the input processed unit data or the input machining unit data. In FIG. 1, the automatic programming apparatus is configured so as to include a material shape data input unit 1, a processed unit data input unit or the processed unit data input part 2, a processing program storage unit 3, a processed region shape generating unit 8, and a control command generating unit 10.

The material shape data input unit 1 receives an external input of data defining the material shape and stores the data into the processing program storage unit 3. In an example where the material shape is a hollow circular cylinder, the data defining the material shape corresponds to a diameter of the circular cylinder surface of the outer circumferential part, a diameter of the circular cylinder surface of the hollow part, and a length of the circular cylinder surface in the central axis direction. The processed unit data input unit or the processed unit data input part 2 is configured to receive an input of other-processed-unit-reference-type processed unit data referencing processed region shape data contained in the processed unit data stored in the processing program storage unit 3; and to output the other-processed-unit-reference-type processed unit data to the processing program storage unit 3. The processed unit data input unit 2 receives an external input of the data defining the processed unit or machined unit such as the processed region shape or the machined region shape, the processing method or the machining method, the tools to be used, and the processing conditions or the machining conditions; and stores the data into the processing program storage unit 3. Examples of the other-processed-unit-reference-type processed unit data include processed unit data for a chamfering process. The processing program storage unit 3 stores therein a list in which pieces of processed unit data containing the material shape data and the other-processed-unit-reference-type processed unit data are arranged according to a processing order.

Further, a post-processing material shape generating unit 4 is configured to generate post-processing material shape data, based on the material shape data and the processed unit data stored in the processing program storage unit 3. The generated post-processing material shape data is displayed and processed by a relevant processed unit data extracting unit 5. The post-processing material shape data is processed-region-removed material shape data obtained by removing a processed region shape of a processed unit that has already been defined from the material shape, based on the material shape data and the processed region shape data of the already-defined processed unit. When the processed unit data input unit 2 received an external input of the processed unit data for a chamfering process, the relevant processed unit data extracting unit 5 renders a graphic display of the post-processing material shape data generated by the post-processing material shape generating unit 4. Further, upon receiving an instruction from an operator indicating a chamfering target part, the relevant processed unit data extracting unit 5 appends, as an attribute, data for specifying a plane of the processed region shape of a corresponding processed unit to a plane of a processed region shape transferred onto the processed-region-removed material shape; extracts data for specifying, based on an edge indicated in the processed-region-removed material shape, a plane of the processed region shape of the processed unit annexed to a plane positioned adjacent to the edge; extracts reference data referenced by processed region shape data in the other-processed-unit-reference-type processed unit based on the extracted data; and forwards the reference data to the processed unit data input unit 2.

When a control command is generated from the processing program, a processing program analyzing unit 6 analyzes the processed unit data stored in the processing program storage unit 3, prepares used tool data and processing condition data for generating tool path data, and forwards the data to a tool path generating unit 7 and a chamfering tool path generating unit 9. The tool path generating unit 7 generates the tool path data from the processed unit data, with respect to processed units other than the processed units for the chamfering process and forwards the tool path data to the control command generating unit 10. When the control command data is generated by analyzing the processed unit data, the processed region shape generating unit 8 generates processed region shape data in the processed unit data for the partial processing i.e., the processed region shape data of the part to which the chamfering process is to be applied, based on the processed region shape data of the processed unit referenced by the other-processed-unit reference-type processed unit data and the material shape data stored in the processing program storage unit 3. Further, the processed region shape generating unit 8 forwards the processed region shape data of the part to which the chamfering process is to be applied, to the chamfering tool path generating unit 9.

The chamfering tool path generating unit 9 generates the tool path data for the chamfering process, based on the processed region shape data for the chamfering process extracted by the processed region shape generating unit 8 with respect to the processed unit for the chamfering process and based on the used tool data and the processing condition data extracted by the processing program analyzing unit 6. The chamfering tool path generating unit 9 then forwards the tool path data to the control command generating unit 10. The control command generating unit 10 is configured to generate the control command data based on the processed unit data for the partial processing containing the processed region shape data. The control command generating unit 10 receives the tool path data generated by the tool path generating unit 7 and the chamfering tool path generating unit 9, generates the control command data for controlling the machine tool, and outputs the generated control command data to a controlling unit (not shown) of a control device.

Figure 2:
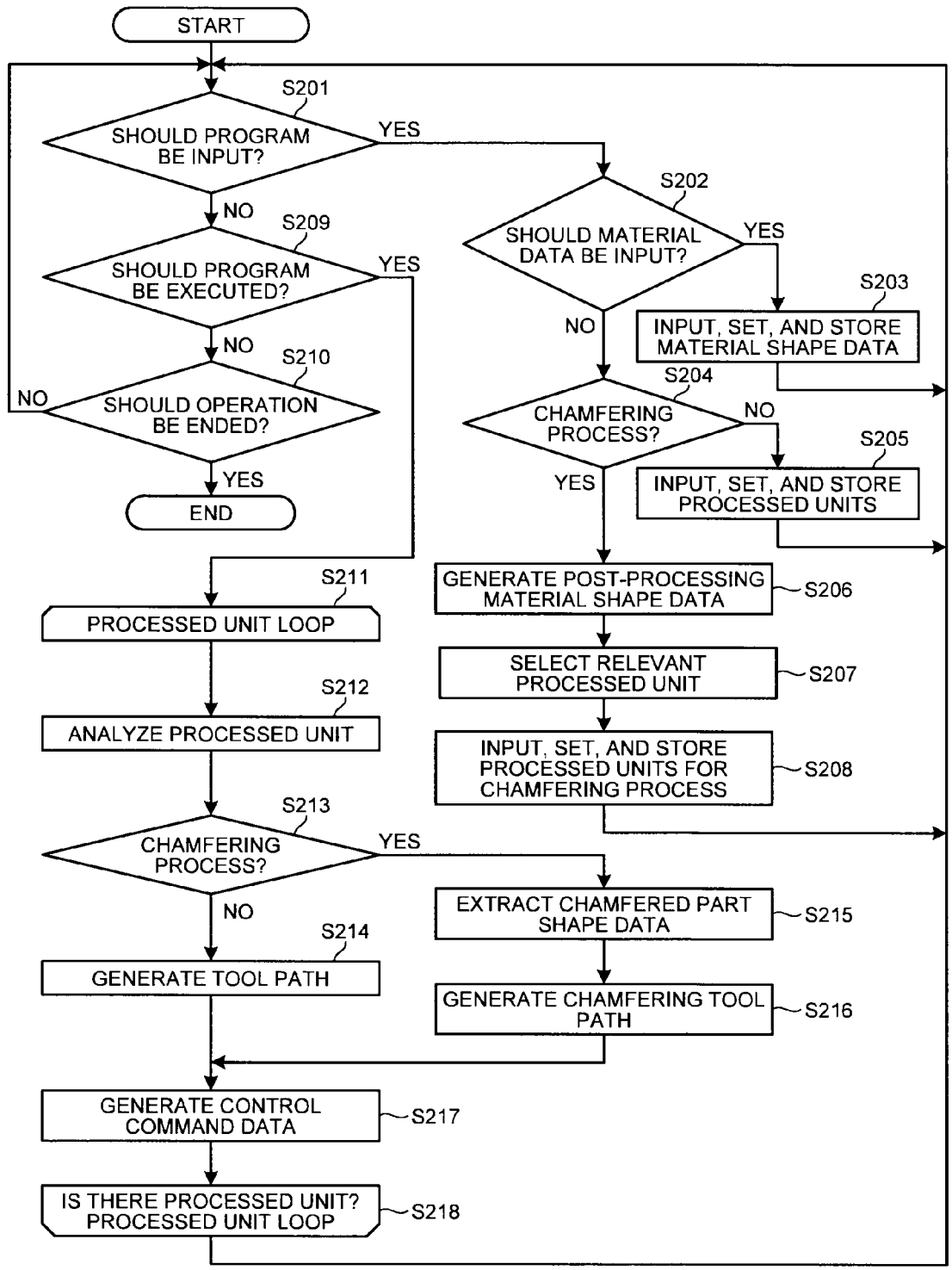
FIG. 2 is a flowchart for the automatic programming apparatus according to the first embodiment of the present invention.

Next, an operation performed by the automatic programming apparatus configured as described above will be explained. FIG. 2 is a flowchart for the automatic programming apparatus according to the first embodiment. The automatic programming apparatus operates according to the flowchart shown in FIG. 2.

At step S201, the instruction from the operator is checked to determine whether the program should be input. If the instruction indicates that the program should be input, the process proceeds to step S202. On the contrary, if the instruction does not indicate that the program should be input, the process proceeds to step S209.

At step S202, the operator instruction is checked to determine whether material shape data should be input. If the instruction indicates that material shape data should be input, the process proceeds to step S203. On the contrary, if the instruction does not indicate that material shape data should be input, the process proceeds to step S204.

At step S203, according to an operator instruction or the like, the material shape data input unit 1 receives an external input of the material shape data so that the input data is stored into the processing program storage unit 3. After the process at step S203 is performed, the process returns to step S201.

At step S204, the operator instruction is checked to determine whether processed unit data for a chamfering process should be input. If the instruction indicates that processed unit data for a chamfering process should be input, the process proceeds to step S206. On the contrary, if the instruction does not indicate that processed unit data for a chamfering process should be input, the process proceeds to step S205.

At step S205, according to an operator instruction, the material shape data input unit 1 receives an external input of data of the processed units other than the processed units for the chamfering process, so that the input data is stored into the processing program storage unit 3.

Figure 5:
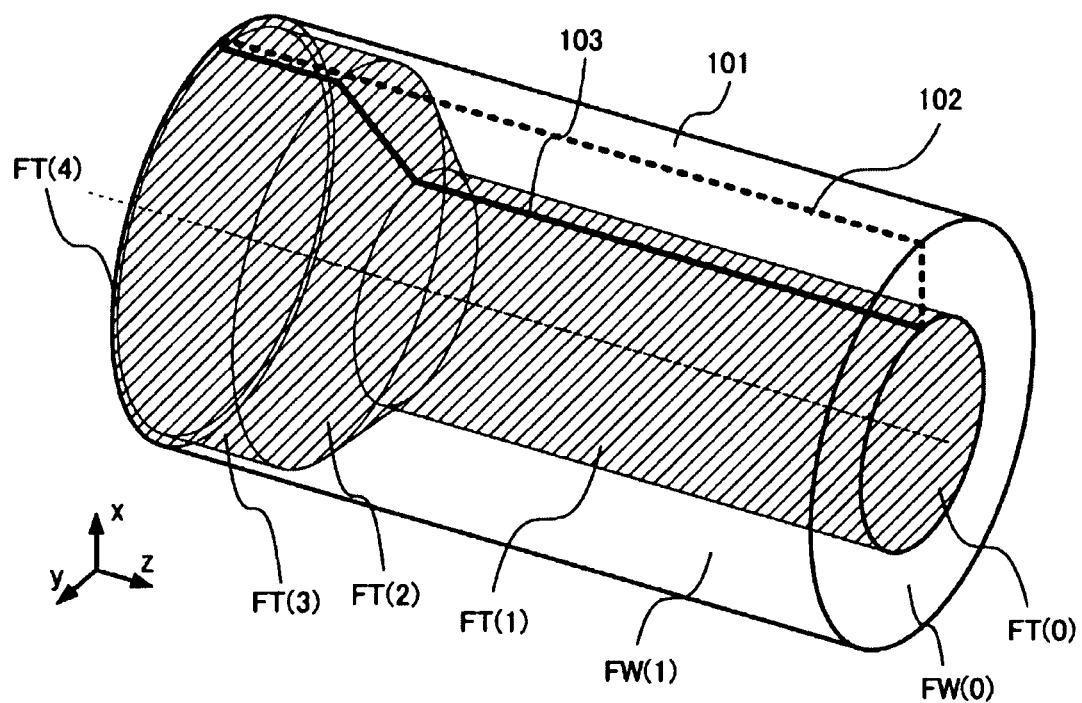
FIG. 5 is a detailed drawing of a processed region shape in the outer-shaving turning process according to the first embodiment of the present invention.

FIGS. 3 to 5 depict examples of the processed unit data for the processing other than the chamfering process. The processed unit data includes data indicating, for example, the processed region shape, the processing method, the tools to be used, and the processing conditions. FIG. 3 depicts an example of the processed unit data for an outer-circumference-shaving turning process (hereinafter, "outer-shaving turning process"). The processed unit data includes: closed contour shape data on the Z-X plane as the processed region shape data; data indicating the type of the processing (an outer-shaving turning process) and the processing procedures (rough processing to finishing processing) as the processing method data; data specifying the tools to be used in each of the processing procedures (the rough processing and the finishing processing) as the used tool data; and data indicating a main shaft rotation number and a feeding speed for each of the processing procedures as the processing conditions.

FIGS. 4(*a*) and 4(*b*) are perspective views depicting material shapes before and after the outer-shaving turning process. FIG. 4(*a*) depicts a material shape before the outer-shaving turning process is performed, whereas FIG. 4(*b*) depicts a material shape after the outer-shape turning process is performed. FIG. 5 is a detailed drawing of a processed region shape in an outer-shaving turning process to form a post-processing material shape from the material shape depicted in FIGS. 4(*a*) and 4(*b*).

When the processing method is the outer-shaving turning process, two types of contour shapes (i.e., a processing goal contour shape 103 and a processed region contour shape 102) on the Z-X plane correspond to the processed region shape defining data. The shape obtained by rotating the contour shapes around the rotation central axis of the turning process (i.e., the axis parallel to the Z-axis) is a processed region shape 101 in actuality. The boundary plane of the processed region shape 101 in actuality is made up of a plane (hereinafter, the "processing goal plane") indicating the position of the goal post-processing shape and the other plane (hereinafter, the "processed region plane"). These two planes are obtained as rotation planes of the processing goal contour shape 103 and the processed region contour shape 102 in the processed region shape data, respectively, and a number is appended to each of the planes. In FIG. 5, FT(i) (where i denotes a number) expresses the processing goal plane, whereas FW(j) (where j denotes a number) expresses the processed region plane.

Also, for the processed units using processing methods other than the outer-shaving turning process, the boundary of each of the processed region shapes in actuality is made up of a processing goal plane and a processed region plane to which numbers are appended. When the data of the processed units other than the processed units for the chamfering process has been input and stored into the processing program storage unit 3, the process returns to step S201.

At step S204, when the instruction indicates that the processed unit data for the chamfering process should be input, the process proceeds to step S206. The processes at steps S206 through S208 are steps performed for inputting/setting the processed unit for the chamfering process.

At step S206, the post-processing material shape generating unit 4 generates the post-processing material shape data, based on the material shape and the already-stored processed unit data that are stored in the processing program storage unit 3.

FIGS. 6(*a*) and 6(*b*) are perspective views depicting material shapes before and after the processing. FIG. 6(*a*) depicts a material shape before the outer-shaving turning process is performed, whereas FIG. 6(*b*) depicts a post-processing material shape formed by three processed units for an outer-shaving turning process, a pocket processing process, and a key groove processing process. The post-processing material shape is obtained by removing the processed region shapes respectively corresponding to the processed units, from the material shape. In FIG. 6(*b*), (i,j) expresses a processed unit and a processed plane, and denotes a processed unit number, whereas j denotes a plane number of the processing goal plane. In the first embodiment, i=1 corresponds to the outer-shaving turning process, whereas i=2 corresponds to the pocket processing process, and i=3 corresponds to the key groove processing process.

Figure 7A:
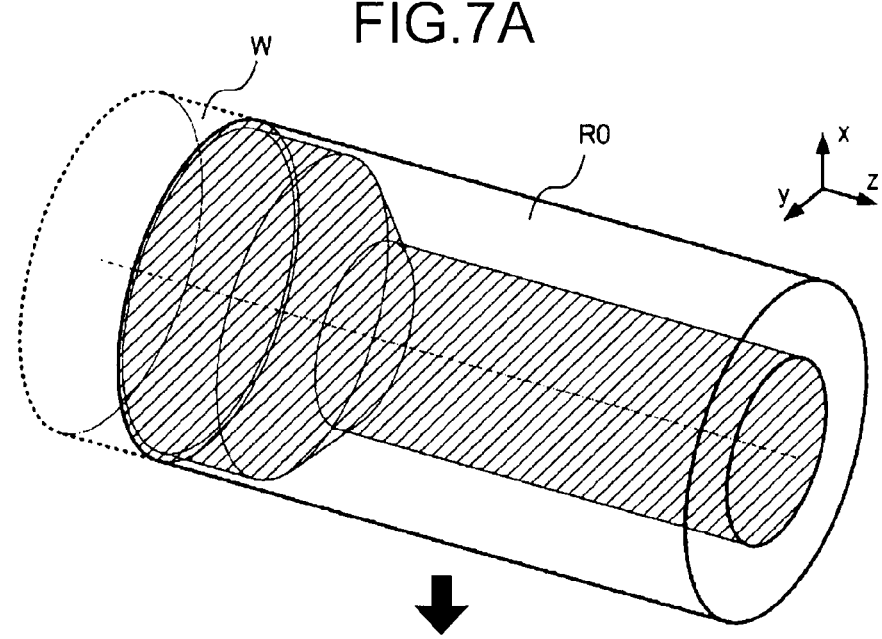
FIGS. 7A, 7B, and 7C are perspective views of processed region shapes respectively correspond to three processed units according to the first embodiment of the present invention.
Figure 7B:
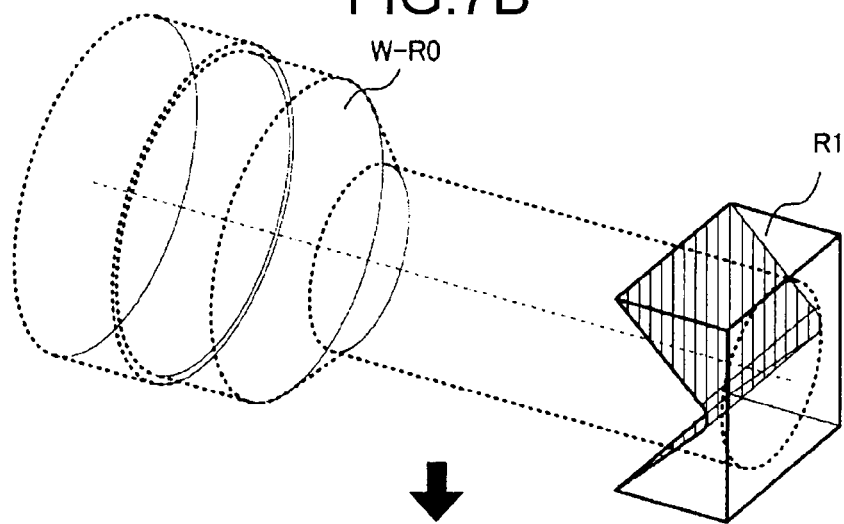
Figure 7C:
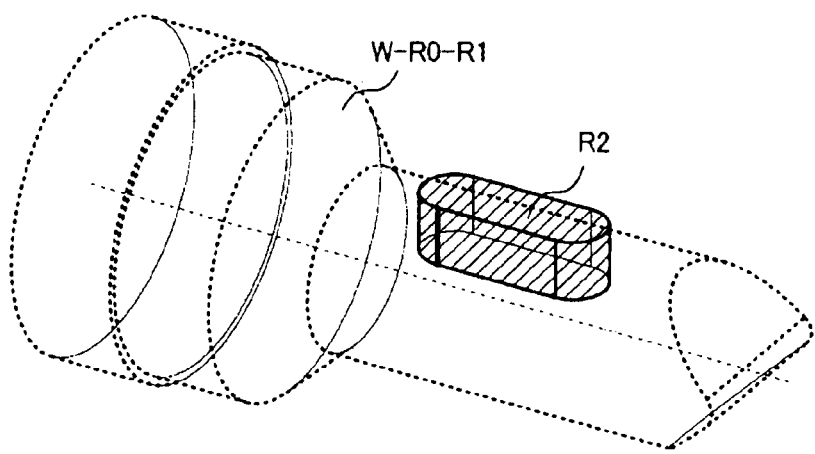

FIGS. 7(*a*), 7(*b*), and 7(*c*) are perspective views of the processed region shapes respectively correspond to the three processed units. FIG. 7(*a*) depicts a material shape W and a processed region shape R0 for the outer-shaving turning process. FIG. 7(*b*) depicts a post-processing material shape W-R0 from which the processed region shape of the outer-shaving turning process is removed and a processed region shape R1 for the pocket processing process realized by, for example, end-face milling processing. FIG. 7(*c*) depicts a post-processing material shape W-R0-R1 from which the processed region shape of the pocket processing process is removed and a processed region shape for the key groove processing process realized by, for example, groove milling processing. Further, when the processed region shape of the key groove processing process is removed from the post-processing material shape, the post-processing material shape depicted in FIG. 6(*b*) is obtained. When a processed region shape is to be removed from a material shape or a post-processing material shape, a pair made up of a processed unit number i and a plane number j of the processing goal plane is appended, as attribute information, to the processing goal plane of the processed region shape transferred to the post-processing region shape after the removal.

At step S207, the relevant processed unit data extracting unit 5 extracts specifying data used for specifying the processed region shape data of the processed unit relevant to the chamfering target part, based on the post-processing material shape data generated by the post-processing material shape generating unit 4 in the following manner: First, a graphic display of the post-processing material shape data is rendered on a screen, so that one edge of the chamfering target part in the post-processing material shape data is selected, according to an instruction from the operator using a pointing device or the like. In this situation, the candidates of edges to be selected from are the following two: an edge between processing goal planes belonging to mutually-different processed units transferred to the post-processing material shape; and an edge between a plane of the material shape and the processing goal plane. After that, attribute data annexed to the processing goal plane positioned adjacent to each selected edge is extracted as the specifying data used for specifying the processed region shape data relevant to the chamfering target part.

FIGS. 8 to 10 depict examples of processed units for the chamfering process performed on selected edges. FIG. 8 is a perspective view of the edges selected as the chamfering target parts. In FIG. 8, the bold line indicates the edges. E(k) (k=0, 1, 2, 3) represents an edge number indicating an edge selected as a chamfering target part. Further, (i,j) expresses a processed unit and a processed plane, where i denotes a processed unit number, where j denotes a plane number of the processing goal plane. FIG. 9 depicts an example of the processed unit data for the chamfering process. The processed unit data includes, as the processed region shape data, chamfering target part shape reference data, a pattern of the chamfered shape, and parameters specifying the size and the angle of the chamfered shape. The chamfering target part shape reference data shown in FIG. 10 is data used for referencing the processed region shape data relevant to the processing target part. The table is structured by collecting the specifying data of the extracted processed region shape data.

In the table showing the chamfering target part shape reference data, each of the edges in the chamfering target parts is expressed by a set made up of processing goal planes positioned adjacent to the edge. Further, each of the processing goal planes is expressed by a number indicating the processed unit and a number indicating the processing goal plane of the processed unit; however, position information of the edges in the chamfering target parts is not directly stored as data. Instead, the position information of the edges in the chamfering target parts is calculated at the stage when the control command data is generated. Thus, even if the position of the processed region shape data of the referenced processed unit is adjusted, it is possible to automatically reflect the result of the adjustment onto the control command data for the chamfering process. Consequently, it is possible to eliminate the trouble of adjusting the chamfering processed unit data.

At step S208, an input of the specifying data of the processed region shape data extracted by the relevant processed unit data extracting unit 5 and the processed unit data of the other chamfering process is received, so that the processed unit data for the chamfering process is stored into the processing program storage unit 3. After the process at step S208 is performed, the process returns to step S201.

At step S209, it is checked to see whether the operator instructs that the program should be executed. If the operator instructs that the program should be executed, the process proceeds to step S211. On the contrary, if the operator does not instruct that the program should be executed, the process proceeds to step S210.

At steps S211 through S218, a loop process is structured so as to generate control command data by taking out each of the pieces of processed unit data stored in the processing program storage unit 3.

At step S212, the processing program analyzing unit 6 analyzes the contents of the processed unit data being the processing target, so as to prepare for a tool path data generating process.

At step S213, it is checked to see whether the processed unit data being the processing target is data for a chamfering process. If the processed unit data is data for a chamfering process, the process proceeds to step S215. On the contrary, if the processed unit data is not data for a chamfering process, the process proceeds to step S214.

At step S214, the tool path generating unit 7 generates a tool path for the processed units other than the processed units for the chamfering process. The generated tool path data is then forwarded to the control command generating unit 10.

At step S215, the processed region shape generating unit 8 extracts the shape data of the chamfering target part, based on both the material shape data stored in the processing program storage unit 3 and the processed region shape data of the processed unit referenced by the processed unit data for the chamfering process, with respect to the processed unit data for the chamfering process, and forwards the extracted data to the chamfering tool path generating unit 9. Based on the chamfering target part shape reference data depicted in FIG. 10, the processed unit number and the plane number within the processed region shape data are referenced for each of the edges in the chamfering target parts, so that two pieces of plane data of the processed region shape are extracted for each of the edges.

At step S216, the chamfering tool path is generated, based on the data relevant to the edge in the chamfered part forwarded as a result of the process at step S215.

At step S217, the control command generating unit 10 receives the tool path data and the chamfering tool path, generates a control command data for operating a machine tool, and outputs the generated control command data to the controlling unit of a numerical control device. If a chamfering tool path is generated at step S216, the control command data is generated based on the tool path data and the chamfering tool path.

At step S218, it is checked to see whether there is any processed unit that has not yet been processed. If there is, the process is looped between steps S211 and S218.

At step S210, it is checked to see whether the operator has instructed that the operation should be ended. If the operator has instructed that the operation should be ended, the program is ended. On the contrary, if the operator has not instructed that the operation should be ended, the process returns to step S201.

As described above, the material shape data input unit 1 receives the external input of the data defining the material shape of each of the processed units, so that the received data is stored into the processing program storage unit 3. The processed unit data input unit 2 receives the input of the other-processed-unit-reference-type processed unit data containing the reference data referencing the processed region shape data of one or more other processed units on which the definition of the processed region shape of each of the processed units is based. The received data is stored into the processing program storage unit 3. Further, when the processed region shape generating unit 8 analyzes the processed unit information and generates the control command data, the processed region shape data of a corresponding processed unit is generated, with respect to the other-processed-unit-reference-type processed unit data, based on the stored material shape data and the processed region shape data of the processed unit referenced by the other-processed-unit-reference-type processed unit data. The shape data of the chamfering target part contains the shape data for the chamfering target part. For this reason, even if it is necessary to perform a chamfering process on an edge of a curved plane where the shape of the processing target part is a complicated curving shape (e.g., an edge of a hole or a groove formed on a circular cylinder surface), it is possible to define the processed units for the chamfering process by, for example, only having an arrangement where the processed region shape data of the processed unit on which the processed region shape is based is referenced. Thus, it is possible to easily define the processed units without the need to input complicated shape information. Consequently, because it is possible to define a processed unit for the chamfering process or the like for each of the processing target parts, it is possible to obtain numerical control information used for performing appropriate processing suitable for the complicated shapes of the processing target parts such as curving parts.

Second Embodiment

Figure 11:
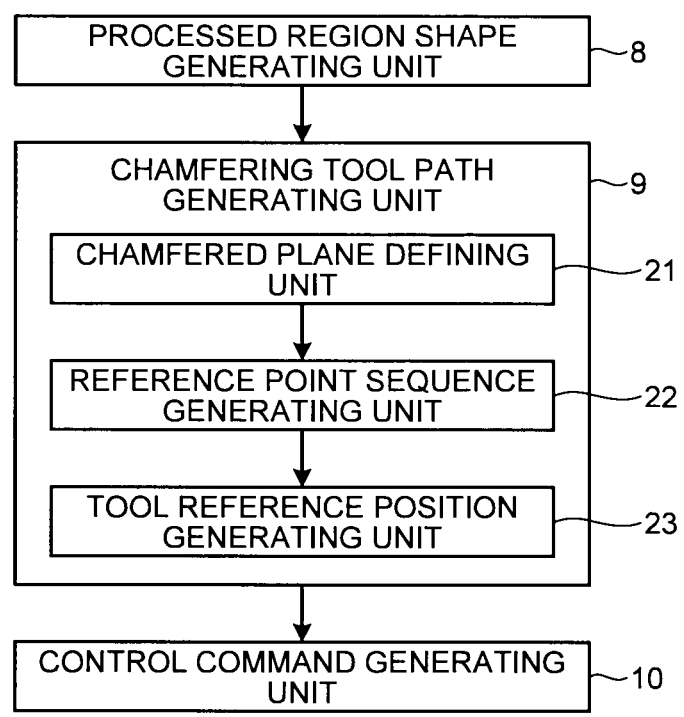
FIG. 11 is a block diagram of a chamfering tool path generating unit according to a second embodiment of the present invention.

FIG. 11 is a block diagram of a chamfering tool path generating unit according to a second embodiment of the present invention. The chamfering tool path generating unit 9 receives, from the processed region shape generating unit 8, an input of the processed region shape data of a part to which a chamfering process is to be applied. In the second embodiment, the process to generate the chamfering tool path, based on the data that is relevant to the edges in the chamfered part and is input from the processed region shape generating unit 8 will be explained in detail. The chamfering tool path generating unit 9 obtains chamfering data from a data storage unit storing therein the data related to the chamfering process and generates a chamfering tool path. According to the second embodiment, the processed region shape generating unit 8 corresponds to the data storage unit; however, depending on the contents of the obtained data, the storing function may also be distributed to the processing program storage unit 3. The chamfering tool path generating unit 9 obtains the data from the data storage unit, generates tool reference position data used for generating the tool path, and forwards the tool reference position data to the control command generating unit 10, which performs the processes to follow.

In FIG. 11, the chamfering tool path generating unit 9 is configured to include a chamfered plane defining unit 21, a reference point sequence generating unit 22, and a tool reference position generating unit 23. For example, the chamfering tool path generating unit 9 is configured to control a processing operation performed by a machining center. With respect to an intersecting edge of processed planes extracted as a chamfering target part based on the data related to the chamfering process and a plane positioned adjacent thereto, the chamfered plane defining unit 21 defines a chamfered plane after the chamfering process is performed (hereinafter, the "chamfered plane") by using a chamfered shape pattern appended to the intersecting edge as an attribute. The reference point sequence generating unit 22 generates a sequence of points to be used as a reference when the chamfering tool path is generated based on the data related to the chamfering process. The tool reference position generating unit 23 calculates a reference position of a chamfering tool used when the tool passes while performing the chamfering process, based on the data related to the chamfering process and the reference points generated by the reference point sequence generating unit 22.

Figure 12A:
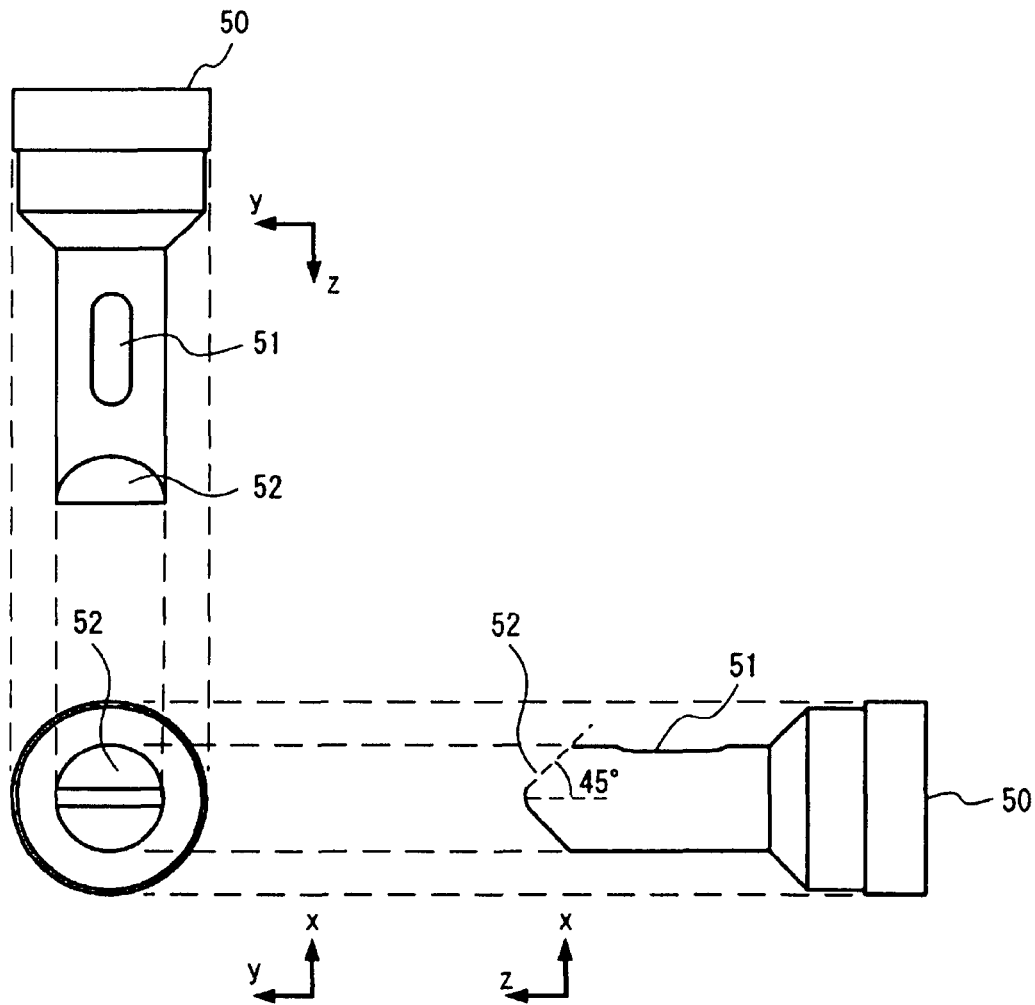
FIGS. 12A and 12B are drawings of examples of material shapes used for explaining a chamfering tool path generating process according to the second embodiment of the present invention.
Figure 12B:
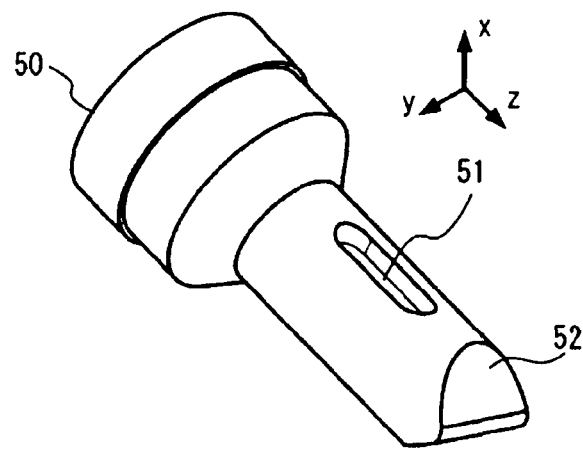
Figure 13:
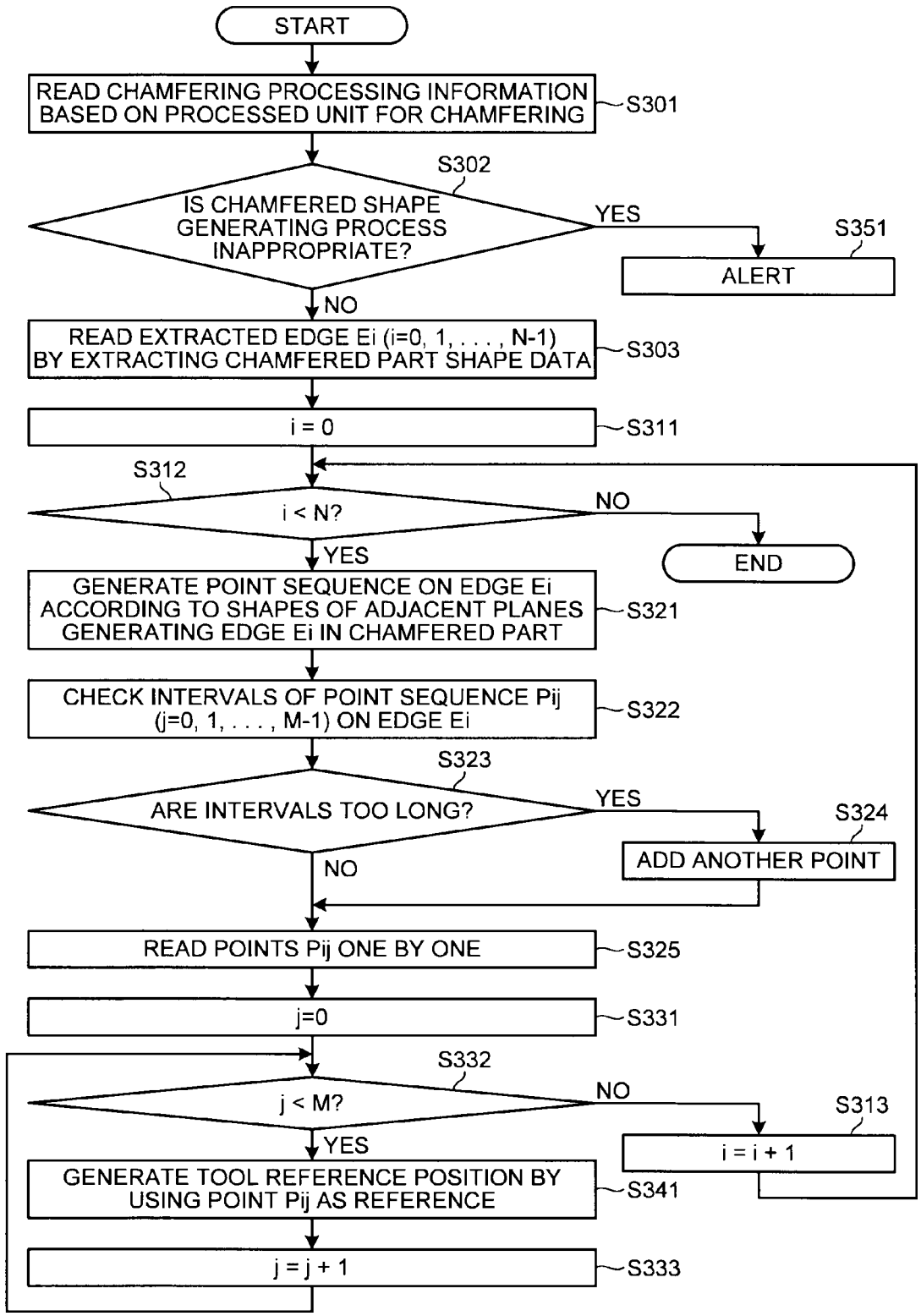
FIG. 13 is a flowchart of a process performed by a chamfering tool path generating unit according to the second embodiment of the present invention.

FIGS. 12(a) and 12(b) depicts examples of material shapes used for explaining the chamfering tool path generating process. FIG. 12(b) is a perspective view, whereas FIG. 12(a) presents a three-direction view made up of a top view, a front view, and a side view. As for a post-processing material shape 50 shown in FIGS. 12(a) and 12(b), chamfered parts 51 and 52 are the chamfered parts specified by the specifying information of the chamfered part stored in the processing program storage unit 3. For example, the chamfered part 51 is obtained by performing a key groove processing process and is structured by an intersecting edge of the circular cylinder surface and the lateral face of the groove shape having a depth in the X-axis direction. The chamfered part 52 is obtained by performing a pocket processing process and is structured by an intersecting edge of the circular cylinder surface and the sloped plane at a 45-degree angle to the circular cylinder surface. In the second embodiment, the chamfering tool path generating process will be explained by using an example of the tool path generating process for the chamfered part 51. More specifically, the chamfering tool path generating unit 9 performs the process according to, for example, the flowchart shown in FIG. 13.

First, at step S301, processing information is read based on a processed unit for the chamfering process stored in the processed region shape generating unit 8. More specifically, the processing information is represented by information of the tools to be used in the chamfering process, shape information of the part to which the chamfering process is to be applied, processing conditions, a pattern of the chamfered shape, and parameters that are stored for each of the processed units.

At step S302, it is judged whether the post-chamfering chamfered plane shape defined based on, among the read processing information, the chamfered part shape data and the chamfered pattern is inappropriate. For example, it is impossible to apply processing having a chamfering amount of 0.5 millimeters to a part having a thickness of 0.5 millimeters. Thus, this process is judged to be inappropriate according to the second embodiment. If the chamfered shape generating process is judged to be inappropriate for the targeted shape part, the process exits from the chamfering tool path generating process corresponding to the read processed unit, so that an alert is displayed to the operator (step S351).

The chamfered shape pattern is one of the patterns that respectively express mutually-different chamfering process defining methods. FIGS. 14 (*a*), 14(*b*), and 14(*c*) depict examples of shape patterns of a chamfered plane that are used in commonly-used processing drawings, with respect to a chamfered part for which the angle in the corner portion (hereinafter, the "corner angle") formed by the planes positioned adjacent to the intersecting edge is equal to α. In FIGS. 14(*a*), 14(*b*), and 14(*c*), the intersecting edge of the processed planes is indicated as ISE. FIG. 14(*a*) depicts shape patterns defined by a and θ, where a denotes the length (hereinafter, the "chamfering amount") of a side of the chamfered shape removed in the chamfering process, whereas θ denotes the angle (hereinafter, the "chamfering angle") formed by a plane positioned adjacent to the intersecting edge and the chamfered plane. Normally, it is often the case that the chamfering amount of the other side is also equal to a. FIG. 14(*b*) depicts shape patterns defined by a and b, where a denotes the chamfering amount defined for one of the adjacent planes positioned adjacent to the intersecting edge, whereas b denotes the chamfering amount defined for the other of the adjacent planes. Normally, it is often the case that b=a is satisfied. FIG. 14(*c*) uses an expressing method employed when the corner angle is 90 degrees while the chamfering amounts are equal between the adjacent planes of an intersecting edge. FIG. 14(*c*) depicts a shape pattern defined by c where c denotes the width of the chamfered plane (hereinafter, the "chamfering width").

If the chamfered shape generating process is not inappropriate, the process proceeds to step S303. At step S303, an edge Ei (i=0, 1, . . . , N−1) extracted in the chamfered part shape data extracting process corresponding to step S215 in the flowchart shown in FIG. 2 is read. To sequentially perform a process on the read edge Ei, the value of i is set to 0 at step S311. After that, at step S312, it is judged whether i is smaller than N (i.e., the total number of edges). If i<N is satisfied, the process proceeds to step S321. If i<N is not satisfied, the chamfering tool path generating process ends, so that the process proceeds to step S217 in the flowchart shown in FIG. 2.

Subsequently, at step S321, a reference point sequence to be used as a reference for the tool path is calculated, with respect to the read edge Ei. There are a number of methods for calculating reference points with respect to an edge; however, in the second embodiment, if an edge is a straight line, the end points are used as the reference points, and if an edge is a curve, points obtained by dividing the edge into sections each approximating a straight line are used as the reference points. It should be noted, however, that if precision for a three-dimensional curved edge is sought, the calculation may be more complicated than necessary. Accordingly, with regard to the chamfering tool path generating process according to the second embodiment, an approximate value is calculated by using a simplified calculating method as explained below.

First, a targeted edge expressed in three dimensions is transferred onto a plane so that the transferred two-dimensional edge is divided into sections, and the points on the original three-dimensional edge respectively corresponding to the dividing points are used as the reference points. In this situation, depending on the dividing method being used, the intervals between the two-dimensional dividing points may be too long or too short. In those situations, the dividing points are corrected so that the intervals between the dividing points become appropriate. In the second embodiment, with respect to the edge Ei, a transferred edge obtained by using a plane determined according to the processing conditions as the transfer plane will be referred to as Ei'.

More specifically, data related to a control axis used in the processing is obtained, according to the data of the tools and the processing conditions obtained based on the processed unit read at step S301. Generally speaking, during a chamfering process, if a ball-end mill is used, it is possible to bring a tool into contact with a processing target part at an angle within a predetermined range, even with three-axis machining; however, if a flat-end mill or a chamfering cutter is used in the processing, it may be necessary to control the rotation axis, too. In the second embodiment also, it is preferable to use a flat-end mill or a chamfering cutter in consideration of the end result and efficiency. In that situation, because it is necessary to control the C-axis, which is the rotation axis around the Z-axis, with respect to a material shape being a circular cylinder shape, five-axis machining is performed.

In the second embodiment, the transfer plane is determined according to the shape characteristics of the chamfered part and the control axis used in the processing. More specifically, the intersecting edge of the plane having a circular cylinder shape and the plane structuring the lateral face of the groove shape is the chamfered part. Thus, because the chamfered part is structured by a straight line parallel to the Z-axis and a curve being the section appearing on the circular cylinder surface, an X-Y plane perpendicular to the Z-axis, which is the central axis of the circular cylinder shape, is used as the transfer plane. With this arrangement, the starting points and the ending points of the straight edges overlap each other in the same points, while the curved edge overlaps a part of an arc obtained by transferring the circular cylinder surface of the circular cylinder shape.

Figure 15A:
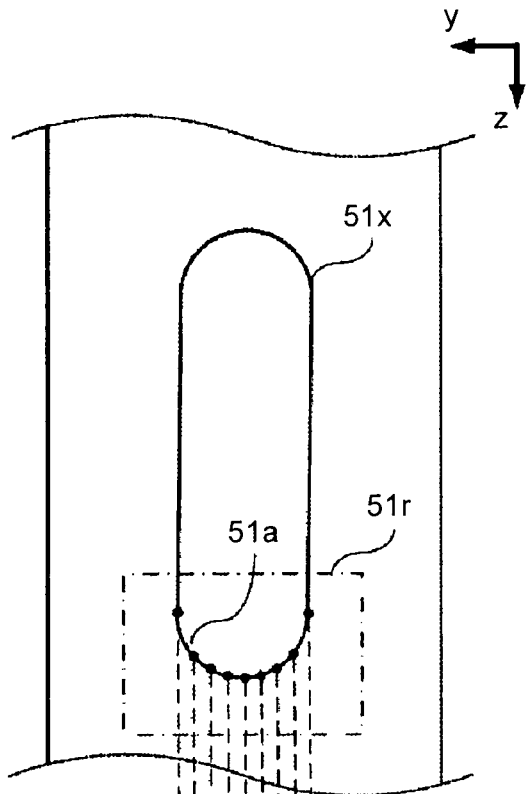
FIGS. 15A and 15B are drawings for explaining a process to generate reference points by dividing a transferred edge according to the second embodiment of the present invention.
Figure 15B:
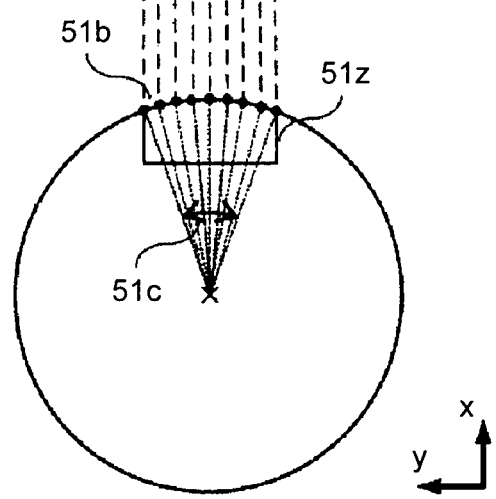
Figure 16A:
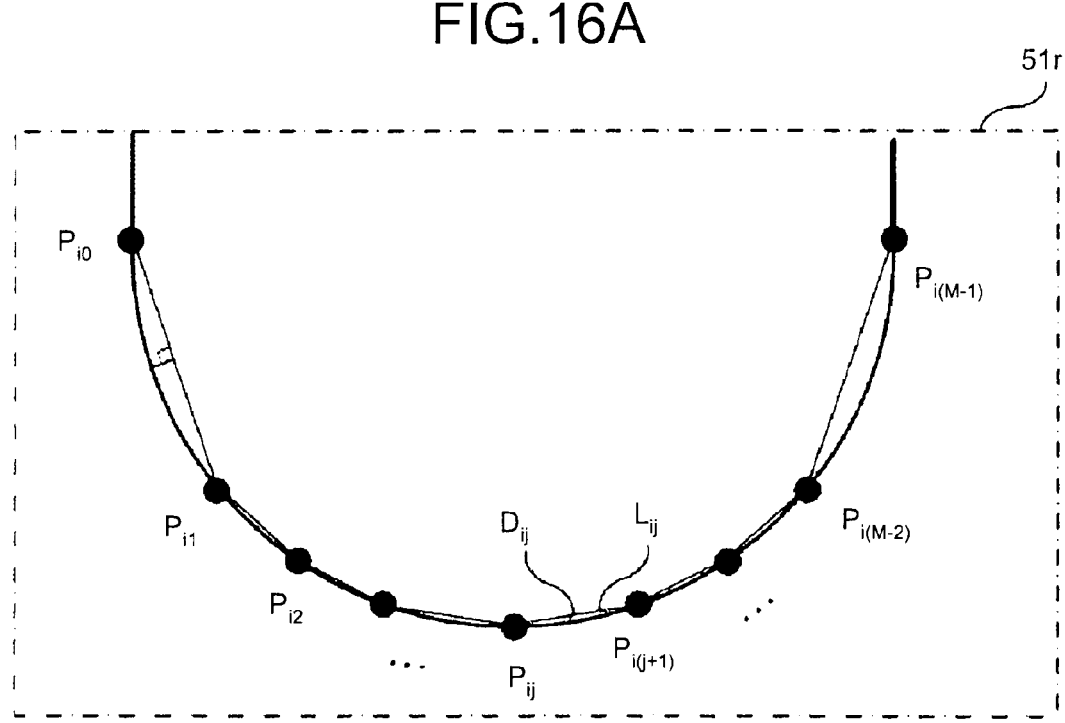
FIGS. 16A and 16B are partial enlarged drawings of the drawing for explaining the process to generate the reference points by dividing the transferred edge according to the second embodiment of the present invention.
Figure 16B:
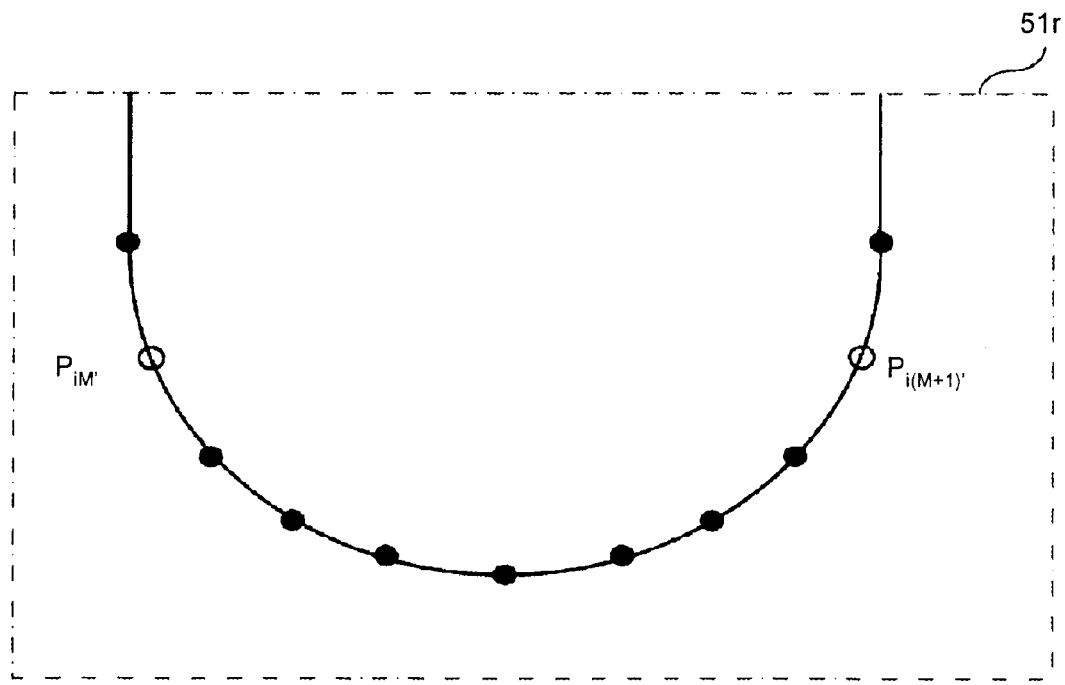

Next, a specific example of the process to generate the reference points by dividing the transferred edge Ei' will be explained with reference to FIGS. 15(*a*) and 15(*b*). FIGS. 15(*a*) and 15(*b*) are enlarged views of the surrounding of the region where the key groove processing process is applied to the material shape shown in FIGS. 12(a) and 12(b). FIG. 15(a) is a view on a Y-Z plane, whereas FIG. 15(b) is a view obtained by transferring FIG. 15(a) onto an X-Y plane. The reference numeral 51x denotes the groove shape viewed on the Y-Z plane. The reference numeral 51a denotes an intersecting edge Ei, which is a curved edge among the constituent elements of the groove shape 51x. The reference numeral 51z denotes a transferred shadow shape of the groove shape indicated by the reference numeral 51x. The reference numeral 51b denotes a transferred edge Ei' of the intersecting edge Ei indicated by the reference numeral 51a. The reference numeral 51c denotes the center angle of the transferred edge Ei' that is the arc indicated by the reference numeral 51b. Further, the reference numeral 51r denotes an arc region of the groove shape 51x. FIGS. 16(a) and 16(b) are partial enlarged drawings of the arc region of the groove shape 51x.

Because the transferred edge Ei' indicated by the reference numeral 51b is an arc, the center angle is equally divided. It is possible to specify the equal division of the angle by using a dividing angle or the number of sections. In the second embodiment, the angle is equally divided into M sections. The obtained dividing points are present on the transfer plane, which is an X-Y plane. Thus, to reflect the dividing points onto the original intersecting edge Ei, the dividing points are transferred onto the intersecting edge Ei in a direction parallel to the Z-axis, so as to obtain new dividing points Pij (j=0, 1, ..., M−1). As shown in FIG. 16(a), the dividing points on the X-Y plane are generated as being transferred onto the intersecting edge Ei, so that the dividing points Pij (j=0, 1, ..., M−1) are set on the Y-Z plane.

Next, at step S323, it is judged whether the intervals between the obtained dividing points Pij are too long. If the intervals are too long, a correcting process is performed at step S324. To judge whether the intervals between the dividing points are too long, it is possible to use, for example, a predetermined tolerance value. An example of the judgment as to whether the intervals between the dividing points are too long will be explained by using a part of the intersecting edge Ei viewed on the Y-Z plane in FIG. 16(a). A straight line Lij connecting together two dividing points Pij and Pi(j+1) that are positioned adjacent to each other is obtained. The maximum distance between the straight line Lij and the arc Pij·Pi(j+1) will be referred to as Dij. In this situation, if the maximum distance Dij is equal to or longer than a predetermined tolerance value, the interval is judged to be "too long" so that the arc Pij·Pi(j+1) is divided into two, and a new dividing point is added at the dividing location. The process described above is repeatedly performed while including the newly-added dividing points, until the interval between any two adjacently-positioned dividing points is no longer judged to be "too long". With the example shown in FIGS. 16(a) and 16(b), an arc Pi0·Pi1 and an arc Pi(M−2)·Pi(M−1) are divided again as shown in FIG. 16(b), so as to obtain the newly generated dividing points PiM' and Pi(M+1)'. The dividing points including these dividing points will be used as the reference points Pij (i=0, 1, ..., N−1; j=0, 1, ...) for the intersecting edge Ei.

Next, a process to calculate the reference position for the chamfering tool to be used when the tool passes while performing a chamfering process will be explained.

At step S325, while using the obtained dividing points Pij as the reference points Pij, the reference points Pij are read one by one.

To sequentially perform the process on the read reference point Pij, j is set to 0 at step S331. At step S332, it is judged whether j is smaller than M (i.e., the total number of dividing points). If j<M is not satisfied, the process ends. On the contrary, if j<M is satisfied, the process proceeds to step S341.

At step S341, a calculating process is performed so as to generate a tool reference position Qij (i=0, 1, ..., N−1; j=0, 1, ...) with respect to each of the reference points (i=0, 1, ..., N−1; j=0, 1, ...). First, to calculate the tool reference position Qij for each of the reference points Pij, a cross-sectional plane Fij is defined in the second embodiment. For example, the cross-sectional plane Fij can be defined as a plane that passes the reference point Pij and is perpendicular to a reference vector Vij, which is a directional vector of the reference point Pij on the intersecting edge Ei.

Figure 17A:
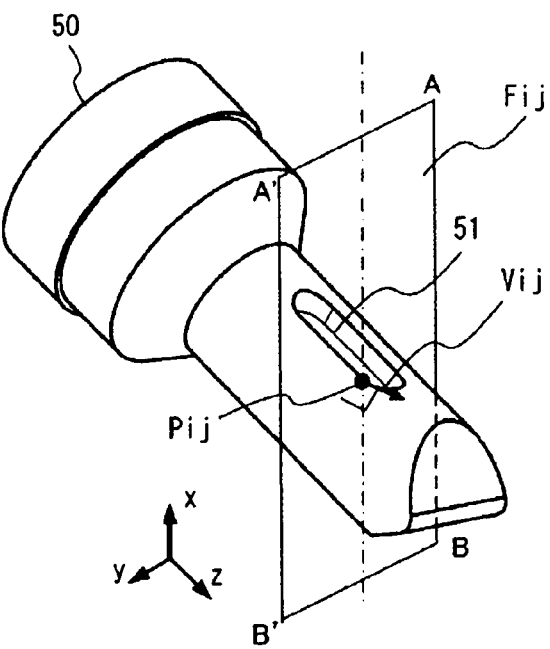
FIGS. 17A, 17B, and 17C are drawings for explaining a cross-sectional plane according to the second embodiment of the present invention.
Figure 17B:
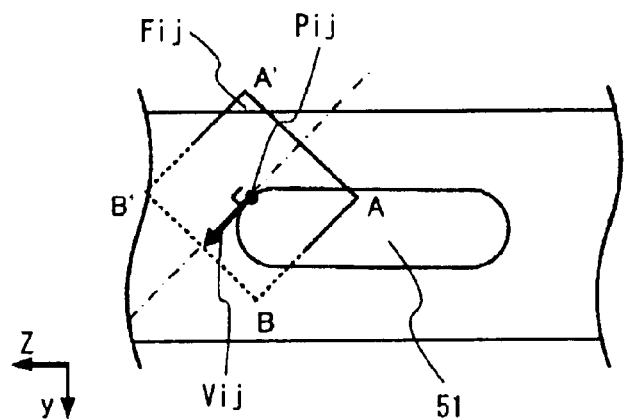
Figure 17C:
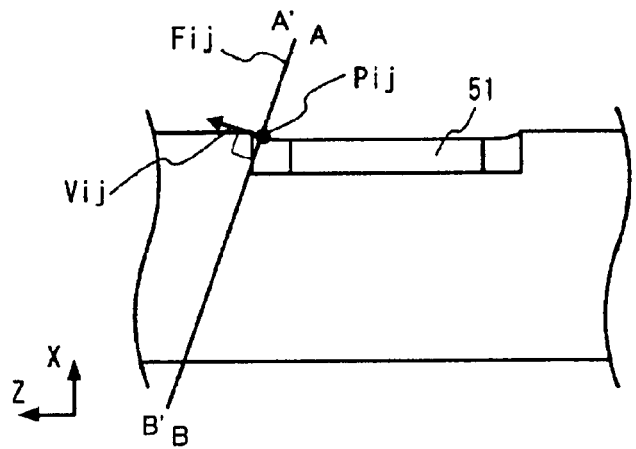

FIGS. 17(a), 17(b), and 17(c) are drawings for explaining the cross-sectional plane defined in the second embodiment. FIG. 17(a) is a perspective view of the post-processing material shape 50. FIG. 17(b) depicts the surrounding of the groove-shaped chamfered part 51 viewed on a Y-Z plane. FIG. 17(c) depicts the surrounding of the groove-shaped chamfered part 51 viewed on an X-Z plane. Vij denotes the reference vector at the reference point Pij. Fij denotes the cross-sectional plane perpendicular to the reference vector Vij.

More specifically, as shown in FIGS. 17(a), 17(b), and 17(c), the reference vector Vij is calculated with respect to the reference point Pij obtained from the calculating process based on the intersecting edge Ei of the processed planes extracted as the chamfering target part, so that a plane perpendicular to the reference vector Vij is defined as the cross-sectional plane Fij. Next, a method for calculating the reference vector Vij will be explained. To calculate the reference vector Vij, normal vectors N1ij and N2ij are calculated respectively for a first processed plane and a second processed plane, which are the two planes positioned adjacent to the intersecting edge Ei. A vector perpendicular to these two normal vectors is defined as the reference vector Vij. More specifically, the reference vector Vij is calculated by calculating an outer product of the normal vectors N1ij and N2ij.

Figure 18:
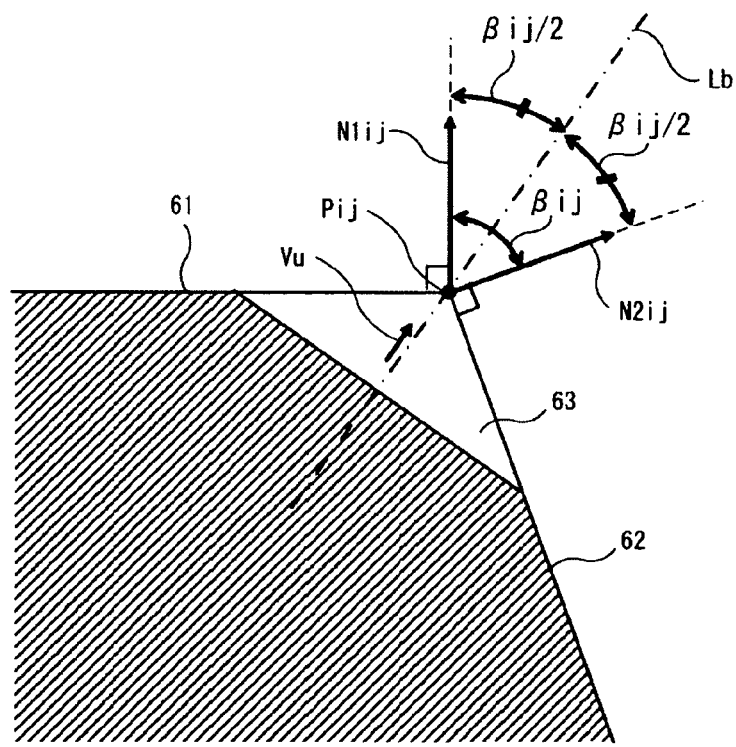
FIG. 18 is an enlarged view of the chamfering target part shown in FIG. 17.

Next, a process to generate tool reference position coordinates to be used as a reference for calculating the tool position during the chamfering process will be explained. FIG. 18 is an enlarged view of the chamfering target part of which a cross-sectional view is obtained by the cross-sectional plane Fij. In FIG. 18, the reference numeral 61 denotes the first processed plane, whereas the reference numeral 62 denotes the second processed plane. The reference numeral 63 denotes a chamfered shape to be removed by the chamfering process. First, with regard to the reference point Pij calculated in the manner described above, the tool reference position Qij calculated according to the used tool data and the chamfered shape pattern is obtained on the cross-sectional plane Fij, while using an intersection point of a halving line Lb and the chamfered plane as a reference, the halving line Lb equally dividing, into two, an angle βij formed by the normal vector N1ij of the first processed plane and the normal vector N2ij of the second processed plane. When a unit vector parallel to the halving line Lb on the cross-sectional plane Fij is expressed as Vu, it is possible to obtain the unit vector Vu by normalizing (N1ij+N2ij)/2.

Figure 19:
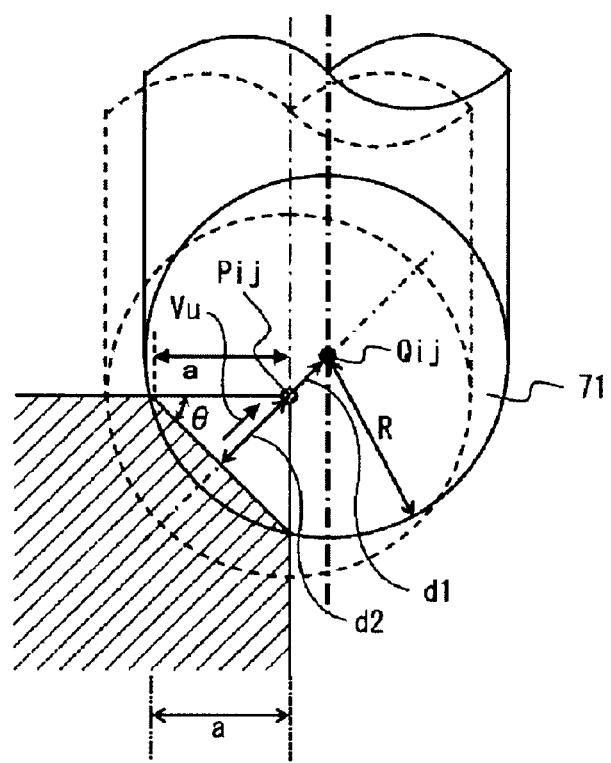
FIG. 19 is a drawing for explaining a process to calculate a distance between a reference point and a tool reference position when a ball-end mill is used according to the second embodiment of the present invention.
Figure 20:
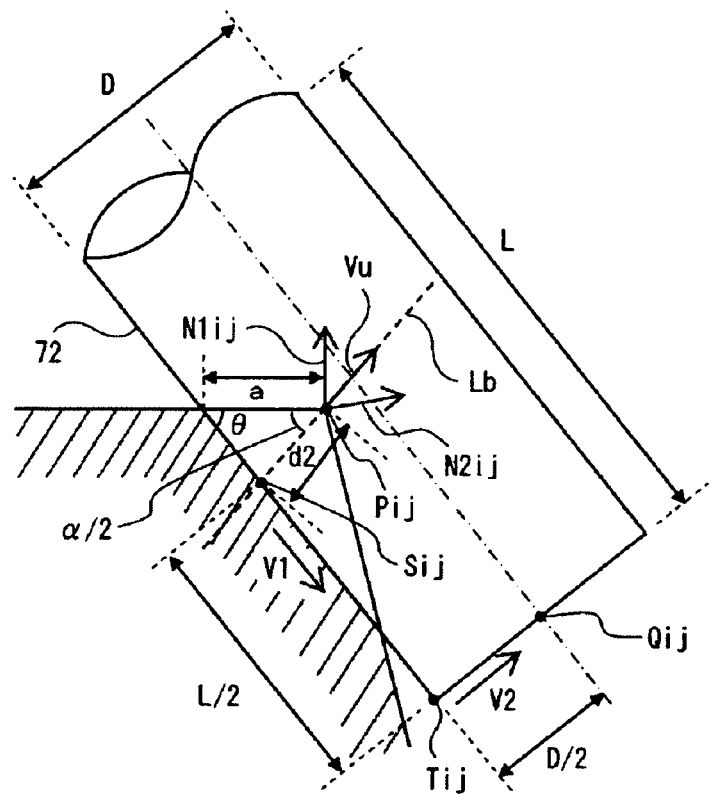
FIG. 20 is a drawing for explaining a process to calculate a distance between a reference point and a tool reference position when a flat-end mill is used according to the second embodiment of the present invention.
Figure 21:
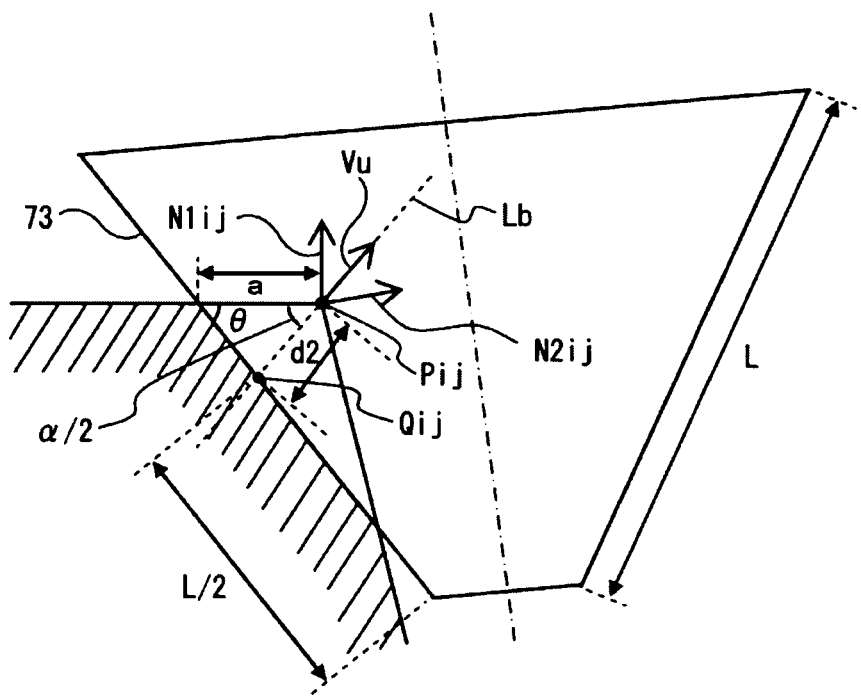
FIG. 21 is a drawing for explaining a process to calculate a distance between a reference point and a tool reference position when a chamfering cutter is used according to the second embodiment of the present invention.

Next, a method for calculating the tool reference position Qij based on a reference point Pij will be explained. FIGS. 19 to 21 are drawings for explaining the process to calculate the tool reference position Qij based on a reference point Pij and depict a cross section by the cross-sectional plane Fij viewed from the positive direction of the reference vector Vij. FIG. 19 is a drawing for explaining a process to calculate the tool reference position Qij when a ball-end mill is used. FIG. 20 is a drawing for explaining a process to calculate the tool reference position Qij when a flat-end mill is used. FIG. 21 is a drawing for explaining a process to calculate the tool reference position Qij when a chamfering cutter is used.

Figure 14A:
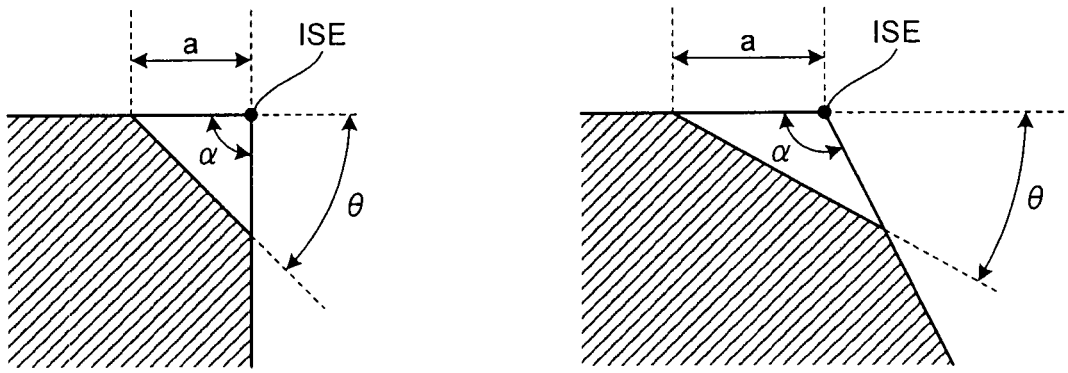
FIGS. 14A, 14B, and 14C are drawings of examples of patterns for chamfering processes used in commonly-used processing drawings.
Figure 14B:
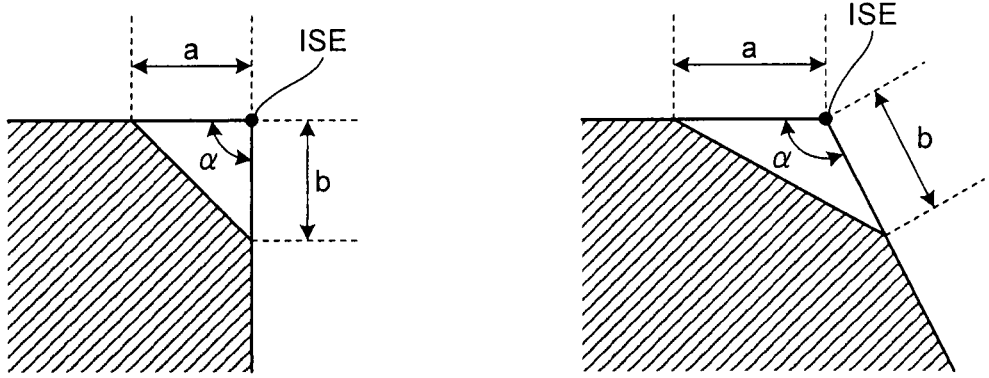
Figure 14C:
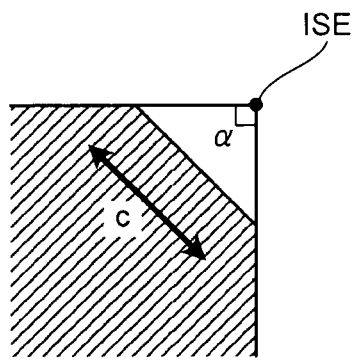

The tool reference position Qij is used as a reference for generating a tool path to apply the processing of generating a chamfered plane defined by one of the chamfered shape patterns explained at step S302 with reference to FIGS. 14(a), 14(b), and 14(c), to the chamfered part. In the following sections, a method for calculating the tool reference position Qij will be explained. In the second embodiment, to accommodate various shapes of the tools to be used, the method for calculating the tool reference position will be defined for each of the different tools to be used. When a ball-end mill is to be used, the center of the ball in the tool will be used as the tool reference position. When a flat-end mill is to be used, the center of the bottom part of the tool will be used as the tool reference position. When a chamfering cutter is to be used, the middle position of the length of the blade in the tool will be used as the tool reference position. Further, the chamfering process explained in the second embodiment is to form the chamfered shape pattern shown in FIG. 14(a) defined by the chamfering amount (a) and the chamfering angle (θ), with respect to the chamfered part having the corner angle (α).

In the second embodiment, an example in which the tool reference position Qij is calculated for the chamfered shape pattern shown in FIG. 14(a) will be explained; however, the calculation method is also applicable for the patterns shown in FIGS. 14(b) and 14(c). More specifically, it is possible to apply the same method as the one used for FIG. 14(a) to an example with the chamfered shape pattern shown in FIG. 14(b), by using an assigned value as the chamfering amount "a" and replacing the chamfering angle θ with a value calculated by using Expression (1).

$$\theta = \tan^{-1}(b \cdot \sin \alpha / (a - b \cdot \cos \alpha)) \quad (1)$$

where $0 < \theta < \pi/2$ and $0 < \alpha < \pi$ are satisfied due to the characteristics of the chamfering process.

Further, it is possible to apply the same method as the one used for FIG. 14(a) to an example with the chamfered shape pattern shown in FIG. 14(c), by arranging the chamfering amount "a" shown in FIG. 14(a) to satisfy $a = c/\sqrt{2}$ and setting the chamfering angle θ shown in FIGS. 14(a) to 45 degrees.

Next, a method for calculating the tool reference position Qij based on the reference point Pij will be explained for each of the different tools. When a ball-end mill 71 having a tool radius R as shown in FIG. 19 is to be used, the tool reference position Qij is the center of the ball in the tool. The tool reference position Qij is calculated by approximately calculating a distance d1 from the reference point Pij to the tool reference position Qij. Based on FIG. 19, it is possible to replace the relationship among the tool radius R, the distance d1, the chamfering angle θ, and the chamfering amount "a", with Expression (2).

$$R^2 = (d1 + d2)^2 + (a \cdot \cos \theta)^2 \quad (2)$$

where $R \geq a$

In this situation, the distance d2 is the distance from the reference point Pij to the chamfered plane. Because it is assumed that $d2 = a \cdot \sin \theta$ is satisfied, it is possible to express the distance d1 by modifying Expression (2) and using Expression (3).

$$d1 = (R^2 - (a \cdot \cos \theta)^2)^{1/2} - a \cdot \sin \theta \quad (3)$$

Based on the relationship $R \geq a$, because the tool reference position Qij is positioned with respect to the reference point Pij in the direction of the unit vector Vu, it is possible to approximately express the tool reference position Qij by using Expression (4).

$$Qij = Pij + d1 \cdot Vu \quad (4)$$
$$= Pij + ((R^2 - (a \cdot \cos\theta)^2)^{1/2} - a \cdot \sin\theta) \cdot Vu$$

When a flat-end mill 72 of which the tool diameter is D and the blade length is L as shown in FIG. 20 is to be used, the center of the bottom part of the tool is used as the tool reference position Qij in the second embodiment, so that the intersection point of the halving line Lb on the cross-sectional plane Fij and the chamfered plane is expressed as Sij and is arranged to coincide with the center of a lateral face of the tool. Based on FIG. 20, the relationship among the distance d2 between the reference point Pij and the point Sij, the chamfering amount "a", the chamfering angle θ, and the corner angle α can be expressed by using Expression (5).

$$d2 = (a \cdot \tan \theta \cdot (1 + \tan^2(\alpha/2))^{1/2})/(\tan \theta + \tan(\alpha/2)) \quad (5)$$

Because the point Sij is present on the chamfered plane, the point Sij is positioned with respect to the reference point Pij in the direction opposite to the unit vector Vu. Thus, the point Sij can be expressed by using Expression (6).

$$Sij = Pij - d2 \cdot Vu \quad (6)$$

Further, of the circumferential part of the bottom part of the tool, when the point positioned closest to the point Sij is expressed as Tij, whereas a unit vector from the point Sij to the point Tij is expressed as V1, and a unit vector from the point Tij to the point Qij is expressed as V2, the point Tij can be expressed by using Expression (7).

$$Tij = Sij + (L/2) \cdot V1 \quad (7)$$

At the point Sij, the unit vector V1 corresponds to a vector obtained by rotating the unit vector Vu in the right-turn direction by an amount (θ+α/2), while using the reference vector Vij corresponding to the normal vector on the cross-sectional plane Fij as a rotation axis, and the unit vector V1 can be expressed by using Expression (8). Accordingly, Expression (8) is assigned to Expression (7).

$$V1 = Vu \cdot \cos(\theta + \alpha/2) + \quad (8)$$
$$(1 - \cos(\theta + \alpha/2)) \cdot (Vu, N) \cdot N + (N \times Vu) \cdot \sin(\theta + \alpha/2)$$

In the second embodiment, (Vu,N) refers to an inner product, whereas (N×VU) refers to an outer product.

Further, the tool reference position Qij can be expressed by using Expression (9).

$$Qij = Tij + (D/2) \cdot V2 \quad (9)$$

Because $Sij Tij \perp Tij Qij$ is satisfied, V2 can be expressed by using Expression (10).

$$V2 = (V1 \times Vij) \quad (10)$$

Accordingly, because the tool reference position Qij can be expressed by using Expression (11), it is possible to assign Expressions (5), (8), and (10) thereto, as necessary:

$$Qij = Pij - d2 \cdot Vu + (L/2) \cdot V1 + D/2 \cdot V2 \quad (11)$$

When a chamfering cutter 73 of which the blade length is L as shown in FIG. 21 is to be used, in the second embodiment, the intersection point of the halving line Lb on the cross-sectional plane Fij and the chamfered plane is used as the tool reference position Qij and is arranged to coincide with the center of a lateral face of the tool. Based on FIG. 21, when the distance between the reference point Pij and the tool reference position Qij is expressed as d2, the tool reference position Qij can be expressed with the chamfering amount "a", the chamfering angle θ, and the corner angle α, by using Expression (12).

$$Qij=Pij-d2\cdot Vu \quad (12)$$

Because the tool reference position Qij is present on the chamfered plane, the tool reference position Qij is positioned with respect to the reference point Pij in the direction opposite to the unit vector Vu. Further, because the distance d2 can be expressed by using Expression (13), it is possible to obtain the position coordinates of the tool reference position Qij by assigning Expression (13) to Expression (12).

$$d2=(a\cdot\tan\theta\cdot(1+\tan^2(\alpha/2))^{1/2})/(\tan\theta+\tan(\alpha/2)) \quad (13)$$

In the manner explained above, it is possible to calculate the tool reference position Qij, which is the reference position of the chamfering tool that is used when the chamfering cutter 73 passes while performing the chamfering process. The tool reference position Qij calculated above is the point used as a reference for generating the path. Thus, when the tool reference position Qij is applied as it is, there may be some situations where a tool conflict occurs. Consequently, it is necessary to make adjustments when the path is generated.

When five-axis machining is performed, posture information of the tool during the processing is also required. It is possible to determine a tool posture by using, as a reference, the position at which the center of the tool is positioned parallel to the cross-sectional plane Fij defined in the second embodiment. With this arrangement, it is possible to reduce the processing amount in the process to calculate the chamfering tool path for the five-axis machining.

Figure 22:
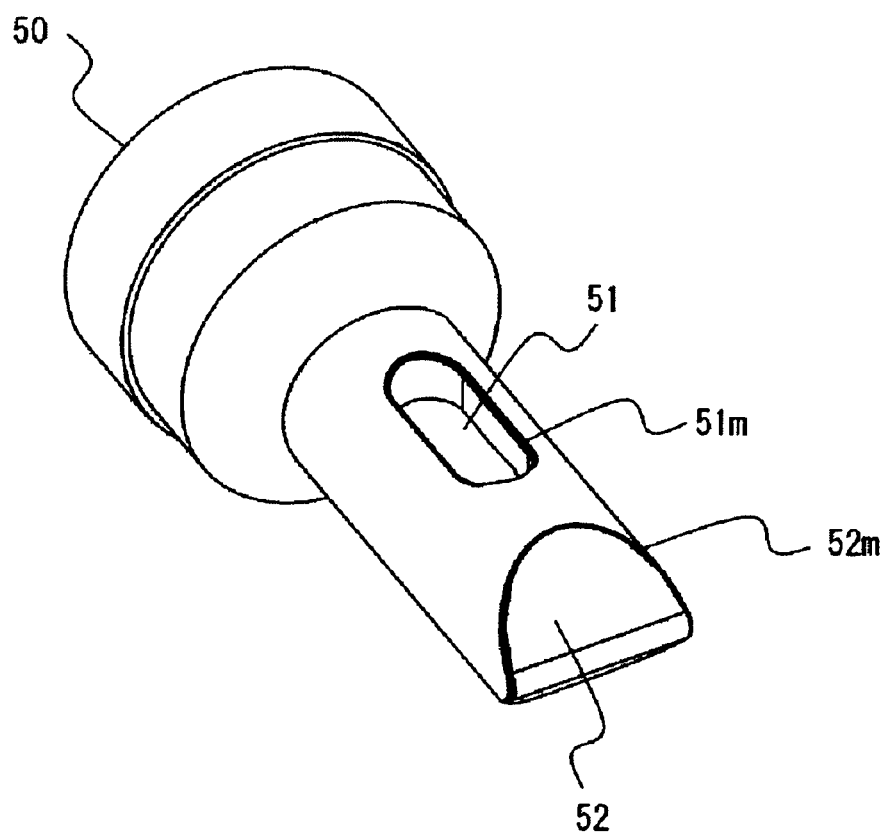
FIG. 22 is a perspective view of chamfered parts after a chamfering process is applied thereto according to the second embodiment of the present invention.

FIG. 22 is a perspective view of the chamfered parts 51 and 52 after the chamfering process using the method described above is applied thereto. In FIG. 22, regions 51m and 52m with the dark rims within the chamfered parts 51 and 52 are the regions to which the chamfering process has been applied.

After that, the process proceeds to step S217 in the flowchart shown in FIG. 2 so that the data of the tool path is received, the control command data for operating the machine tool is generated, and the generated control command data is output to the controlling unit of the numerical control device.

At step S218, it is checked to see whether there is any processed unit that has not yet been processed. If there is, the process is looped between steps S211 and S218.

At step S210, it is checked to see whether the operator has instructed that the operation should be ended. If the operator has instructed that the operation should be ended, the operation is ended. Otherwise, the process returns to step S201.

By performing the chamfering process using the method described above, it is possible to generate the tool path for the chamfering process with the simple operation, even if a Computer Aided Design (CAD) device or a Numerical Control (NC) device having special functions is not available. As a result, it is possible to shorten the operation period and improve the processing efficiency. Further, because it is possible to select a chamfered shape pattern and a tool according to the chamfered part, it is also possible to improve the processing efficiency by, for example, performing the chamfering process all at once with five-axis machining that uses a chamfering cutter or a flat-end mill. Consequently, it is possible to realize a chamfering process that meets the operator's demand.

Third Embodiment

Figure 23A:
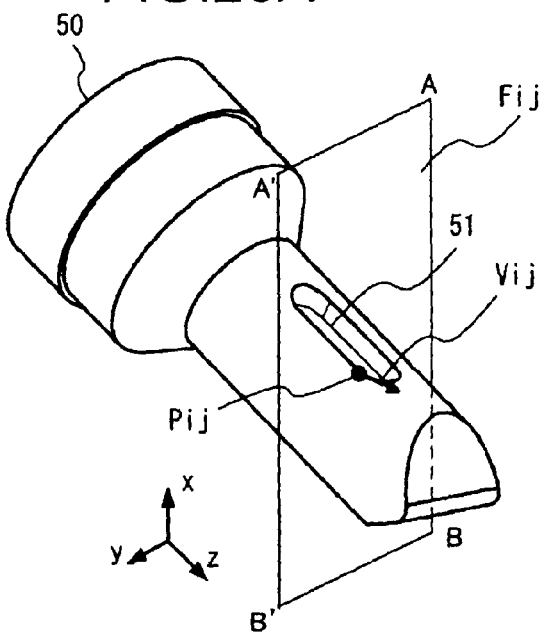
FIGS. 23A, 23B, and 23C are drawings for explaining a cross-sectional plane according to a third embodiment of the present invention.
Figure 23B:
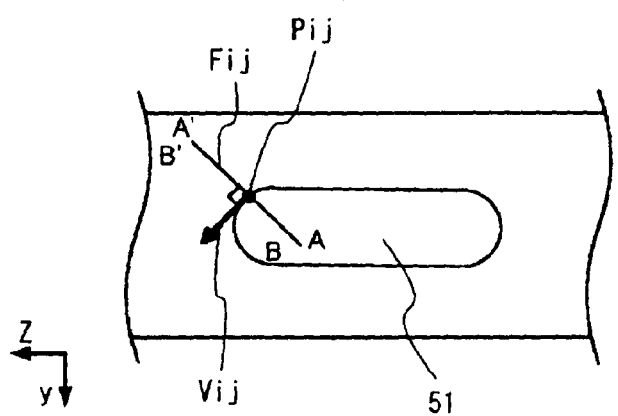
Figure 23C:
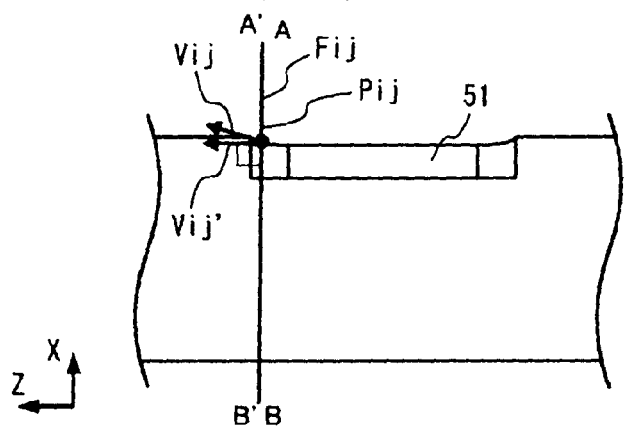

FIGS. 23(a), 23(b), and 23(c) are drawings for explaining a cross-sectional plane defined in a third embodiment of the present invention. In the second embodiment, the chamfering tool path generating process is based on the assumption that five-axis machining is performed; however, it is also possible to approximately calculate a tool path by applying the method to three-axis machining. It should be noted, however, that the process related to the cross-sectional plane Fij is slightly different because the tool posture is fixed in the three-axis machining, unlike in the five-axis machining. The difference from the second embodiment will be explained below.

As shown in FIGS. 23 (a), 23(b), and 23(c), the cross-sectional plane Fij in the three-axis machining is defined as a plane that passes the reference point Pij and is perpendicular to a transferred vector Vij' generated by transferring the reference vector Vij, which is a directional vector of the reference point Pij for the edge Ei, onto a plane perpendicular to the depth direction (i.e., the X direction) of the groove. More specifically, the reference vector Vij is calculated for each of the reference points Pij obtained by dividing the transferred edge Ei' from the intersecting edge Ei of the processed planes extracted as a chamfering target part, so that the plane perpendicular to the transferred vector Vij' generated by transferring the reference vector Vij onto the plane perpendicular to the depth direction of the groove is used as the cross-sectional plane Fij.

The reference vector Vij can be calculated by using the same method as the one explained in the second embodiment. Further, with reference to the drawing explaining the cross section by the cross-sectional plane Fij shown in FIG. 18 according to the second embodiment, the process should be performed by replacing the vector N1ij with a vector transferred onto the cross-sectional plane Fij calculated by using the method described above with respect to the normal vector N1 of the first processed plane 61 and replacing the vector N2ij with a vector transferred onto the cross-sectional plane Fij calculated by using the method described above with respect to the normal vector N2 of the second processed plane 62. The processes thereafter should also be performed in the same manner as in the second embodiment. As explained here, it is possible to approximately calculate the tool path by applying the method to the example with the three-axis machining.

REFERENCE SIGNS LIST

1 MATERIAL SHAPE DATA INPUT UNIT
2 PROCESSED UNIT DATA INPUT UNIT
3 PROCESSING PROGRAM STORAGE UNIT
4 POST-PROCESSING MATERIAL SHAPE GENERATING UNIT
5 RELEVANT PROCESSED UNIT DATA EXTRACTING UNIT
6 PROCESSING PROGRAM ANALYZING UNIT
7 TOOL PATH GENERATING UNIT
8 PROCESSED REGION SHAPE GENERATING UNIT
9 CHAMFERING TOOL PATH GENERATING UNIT
10 CONTROL COMMAND GENERATING UNIT
21 CHAMFERED PLANE DEFINING UNIT
22 REFERENCE POINT SEQUENCE GENERATING UNIT

23 TOOL REFERENCE POSITION GENERATING UNIT
50 POST-PROCESSING MATERIAL SHAPE
51, 52 CHAMFERED PART
61 FIRST PROCESSED PLANE
62 SECOND PROCESSED PLANE
101 PROCESSED REGION SHAPE
102 PROCESSED REGION CONTOUR SHAPE
103 PROCESSING GOAL CONTOUR SHAPE
Ei INTERSECTING EDGE
Ei' TRANSFERRED EDGE
Fij CROSS-SECTIONAL PLANE
N1$ij$, N2$ij$ NORMAL VECTOR
Pij REFERENCE POINT
Qij TOOL REFERENCE POSITION
Vij REFERENCE VECTOR
Vij' TRANSFERRED VECTOR

The invention claimed is:

1. An automatic programming apparatus that generates control command data, based on processed unit data for partial processing to apply partial processing to a material shape, comprising:

a material shape data input unit that receives an input of data of the material shape;

a processing program storage unit that stores therein the data of the material shape and processed unit data;

a processed unit data input part that receives input data from a relevant processed unit data extracting unit and outputs output data to the processing program storage unit, the input data includes other-processed-unit-reference-type processed unit data that references processed region shape data contained in the processed unit data stored in the processing program storage unit, and the output data output by the processed unit data input part and provided to the processing program storage unit includes the other-processed-unit-reference-type processed unit data;

a processed region shape generating unit that generates processed region shape data in the processed unit data for the partial processing, based on the data of the material shape and the processed region shape data referenced by the other-processed-unit-reference-type processed unit data;

a control command generating unit that generates the control command data, based on the processed unit data for the partial processing containing the processed region shape data;

a post-processing material shape generating unit that, based on the data of the material shape stored in the processing program storage unit and the processed region shape data in the processed unit data that has already been defined, generates shape data of a processed-region-removed material shape obtained by removing a processed region shape of the already-defined processed unit data from the material shape; and a relevant processed unit data extracting unit that appends, as an attribute, data for specifying a plane of a processed region shape of a corresponding processed unit to a plane of a processed region shape transferred onto the processed-region-removed material shape, extracts data for specifying, based on an edge indicated in the processed-region-removed material shape, a plane of a processed region shape of a processed unit annexed to a plane positioned adjacent to the edge, and generates reference data to be referenced by the other-processed-unit-reference-type processed unit data that is the input data received by the processed unit data input part.

2. An automatic programming method for generating control command data, based on processed unit data for partial processing to apply partial processing to a material shape, comprising:

storing, in a processing program storage unit, data of the material shape and processed unit data;

receiving, at a processed unit data input part from a relevant processed unit data extracting unit, other-processed-unit-reference-type processed unit data that references processed region shape data contained in the stored processed unit data;

generating processed region shape data in the processed unit data for the partial processing, based on the data of the material shape and the processed region shape data referenced by the other-processed-unit-reference-type processed unit data;

generating the control command data, based on the processed unit data for the partial processing containing the processed region shape data;

generating, based on the data of the material shape stored in the processing program storage unit and the processed region shape data in the processed unit data that has already been defined, shape data of a processed-region-removed material shape obtained by removing a processed region shape of the already-defined processed unit data from the material shape;

appending, as an attribute, data for specifying a plane of a processed region shape of a corresponding processed unit to a plane of a processed region shape transferred onto the processed-region-removed material shape;

extracting data for specifying, based on an edge indicated in the processed-region-removed material shape, a plane of a processed region shape of a processed unit annexed to a plane positioned adjacent to the edge;

generating reference data to be referenced by the other-processed-unit-reference-type processed unit data; and outputting, to the processed unit data input unit, the other-processed-unit-reference-type processed unit data that references the processed region shape data stored in the processing region program storage unit.

\* \* \* \* \*

UNITED STATES PATENT AND TRADEMARK OFFICE
CERTIFICATE OF CORRECTION

| | |
|---|---|
| PATENT NO. | : 9,152,143 B2 |
| APPLICATION NO. | : 13/377292 |
| DATED | : October 6, 2015 |
| INVENTOR(S) | : Iriguchi et al. |

It is certified that error appears in the above-identified patent and that said Letters Patent is hereby corrected as shown below:

In the specification

Column 4, line 65 change "plane" to --face--.

Column 4, line 67 change "plane" to --face--.

Column 5, line 3 change "plane" to --face--.

Column 5, line 4 change "plane" to --face--.

Column 6, line 53 change "plane" to --face--.

Column 6, line 54 change "plane" to --face--.

Column 6, line 57 change "plane" to --face-- and "planes" to --faces--.

Column 6, line 58 change "planes" to --faces--.

Column 6, line 61 change "planes" to --faces--.

Column 6, line 62 change "plane" to --face--.

Column 6, line 64 change "plane" to --face--.

Column 7, line 1 change "plane" to --face--.

Column 7, line 26 change "plane" to --face--.

Column 7, line 27 change "plane" to --face--.

Column 7, line 28 change "plane" to --face--.

Column 7, line 52 change "plane" to --face--.

Signed and Sealed this
Twelfth Day of July, 2016

Michelle K. Lee
*Director of the United States Patent and Trademark Office*

In the specification

Column 7, line 53 change "plane" to --face--.

Column 7, line 67 change "plane" to --face--.

Column 8, line 2 change "plane" to --face--.

Column 8, line 3 change "plane" to --face--.

Column 8, line 4 change "plane" to --face--.

Column 8, line 14 change "plane" to --face--.

Column 8, line 15 change "plane" to --face--.

Column 8, line 29 change "planes" to --faces--.

Column 8, line 31 change "planes" to --faces--.

Column 8, line 32 change "plane" to --face--.

Column 9, line 16 change "plane" to --face--.

Column 9, line 19 change "plane" to --face--.

Column 10, line 36 change "plane" to --face--.

Column 10, line 41 change "planes" to --faces--.

Column 10, line 43 change "plane" to --face--.

Column 10, line 44 change "plane" to --face--.

Column 10, line 45 change "plane" to --face--.

Column 10, line 46 change "plane" to --face--.

Column 11, line 36 change "plane" to --face--.

Column 11, line 39 change "planes" to --faces--.

Column 11, line 42 change "planes" to --faces--.

Column 11, line 46 change "plane" to --face--.

Column 11, line 48 change "plane" to --face--.

Column 11, line 51 change "planes" to --faces--.

Column 11, line 57 change "planes" to --faces--.

CERTIFICATE OF CORRECTION (continued)
U.S. Pat. No. 9,152,143 B2

In the specification

Column 11, line 59 change "plane" to --face--.

Column 12, line 51 change "plane" to --face--.

Column 12, line 52 change "plane" to --face--.

Column 14, line 27 change "planes" to --faces--.

Column 14, line 28 change "plane" to --face--.

Column 14, line 33 change "plane" to --face--.

Column 14, line 34 change "plane" to --face-- and "planes" to --faces--.

Column 14, line 45 change "plane" to --face--.

Column 14, line 46 change "plane" to --face--.

Column 14, line 53 change "plane" to --face--.

Column 14, line 55 change "plane" to --face--.

Column 14, line 56 change "plane" to --face--.

Column 15, line 7 change "plane" to --face--.

Column 16, line 16 change "plane" to --face--.

Column 16, line 24 change "plane" to --face--.

Column 17, line 1 change "plane" to --face--.

Column 17, line 13 change "plane" to --face--.

Column 18, line 27 change "planes" to --faces--.

Column 18, line 41 change "plane" to --face--.

Column 18, line 44 change "plane" to --face--.

Column 18, line 65 change "PLANE" to --FACE--.

Column 19, line 5 change "PLANE" to --FACE--.

Column 19, line 6 change "PLANE" to --FACE--.

CERTIFICATE OF CORRECTION (continued)
U.S. Pat. No. 9,152,143 B2

In the claims

Column 20, line 2, claim 1 change "plane" to --face--.

Column 20, line 4, claim 1 change "plane" to --face--.

Column 20, line 7, claim 1 change "plane" to --face--.

Column 20, line 9, claim 1 change "plane" to --face--.

Column 20, line 41, claim 2 change "plane" to --face--.

Column 20, line 43, claim 2 change "plane" to --face--.

Column 20, line 46, claim 2 change "plane" to --face--.

Column 20, line 48, claim 2 change "plane" to --face--.